US012601813B2

(12) United States Patent
Va et al.

(10) Patent No.: US 12,601,813 B2
(45) Date of Patent: Apr. 14, 2026

(54) VIRTUAL TOUCH INTERACTION FOR ANY DISPLAY DEVICES USING RADAR

(71) Applicant: Samsung Electronics Co., Ltd., Suwon-si (KR)

(72) Inventors: Vutha Va, Plano, TX (US); Anum Ali, Frisco, TX (US); Boon Loong Ng, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 18/613,070

(22) Filed: Mar. 21, 2024

(65) Prior Publication Data

US 2024/0369684 A1 Nov. 7, 2024

Related U.S. Application Data

(60) Provisional application No. 63/463,463, filed on May 2, 2023.

(51) Int. Cl.

| | |
|---|---|
| *G02B 27/01* | (2006.01) |
| *G01J 1/44* | (2006.01) |
| *G01S 7/41* | (2006.01) |
| *G01S 13/58* | (2006.01) |
| *G06F 3/01* | (2006.01) |
| *G09G 5/00* | (2006.01) |

(52) U.S. Cl.
CPC ............ *G01S 7/415* (2013.01); *G01S 13/581* (2013.01); *G06F 3/011* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 10,653,960 B2 | 5/2020 | Tang et al. | |
| 11,555,915 B2 | 1/2023 | Va et al. | |
| 2016/0048021 A1* | 2/2016 | Border ............... | G02B 27/0172 |
| | | | 356/445 |
| 2022/0032183 A1 | 2/2022 | Wei et al. | |

FOREIGN PATENT DOCUMENTS

| | | |
|---|---|---|
| CN | 113986099 A | 1/2022 |
| CN | 116099197 A | 5/2023 |
| EP | 4173574 A1 | 5/2023 |

* cited by examiner

*Primary Examiner* — Carl Adams

(57) ABSTRACT

A method, implemented by a processor coupled to a transceiver that transceives radar signals in a field of view (FoV), includes obtaining radar data based on the radar signals. The method includes, for each respective object among a set of objects detected: determining a set of parameters associated with the respective object, based on the radar signals; and selecting the respective object as a target that is within a region-of-interest (ROI), if the set of parameters satisfy a definition of the ROI. The set of parameters includes a normal angle of the respective object. The definition of the ROI is satisfied if the normal angle of the respective object is within a normal-angle threshold interval. The method includes tracking a state of the target with respect to the ROI to detect virtual interactions with a display area that is associated with an external display device and that overlaps the FoV.

20 Claims, 15 Drawing Sheets

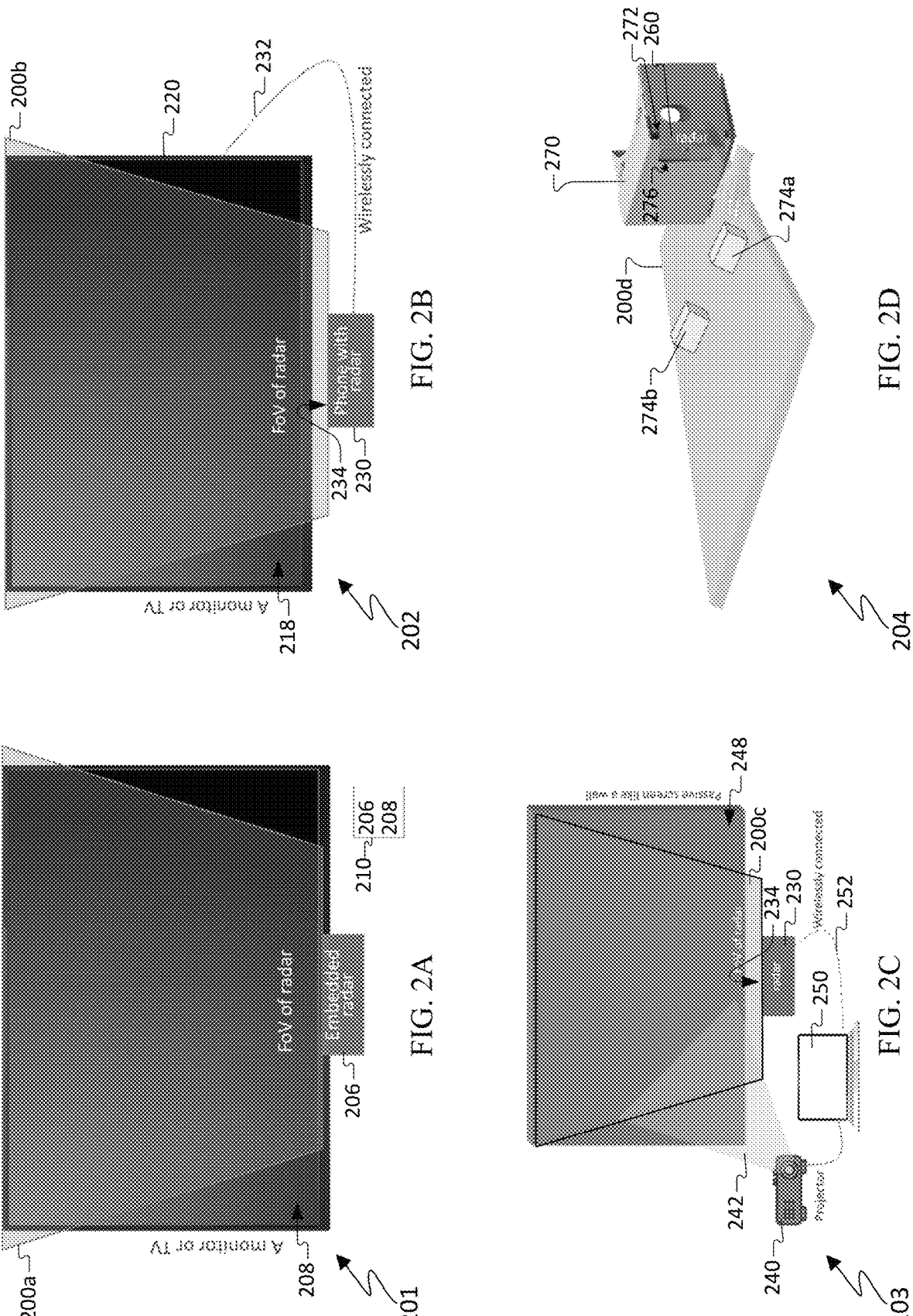

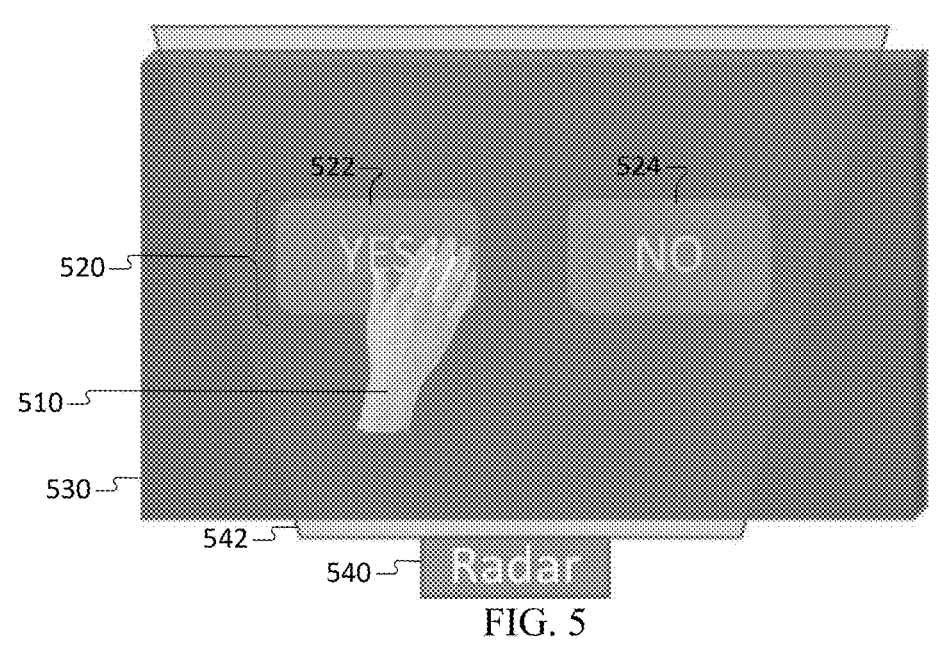
FIG. 5
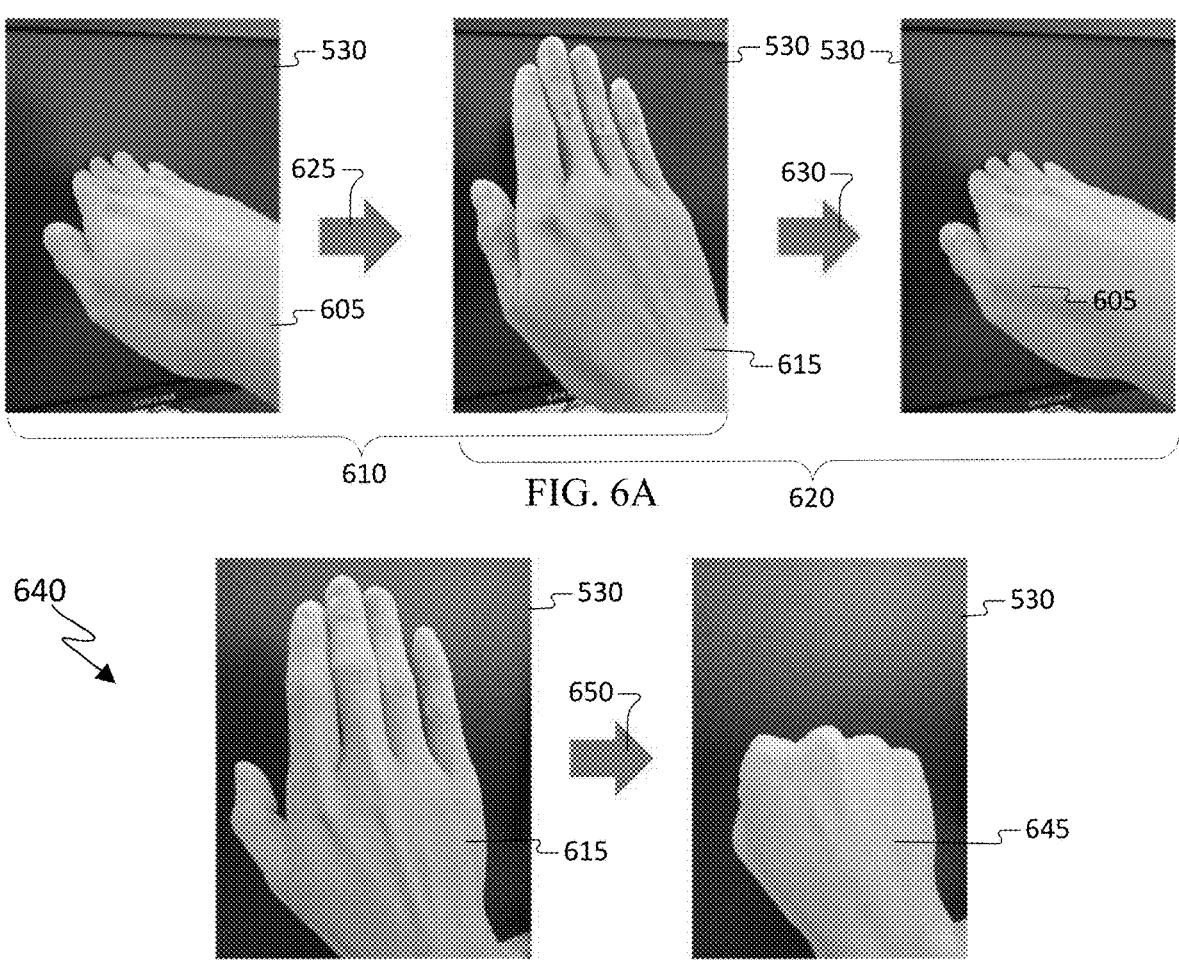
FIG. 6A
FIG. 6B

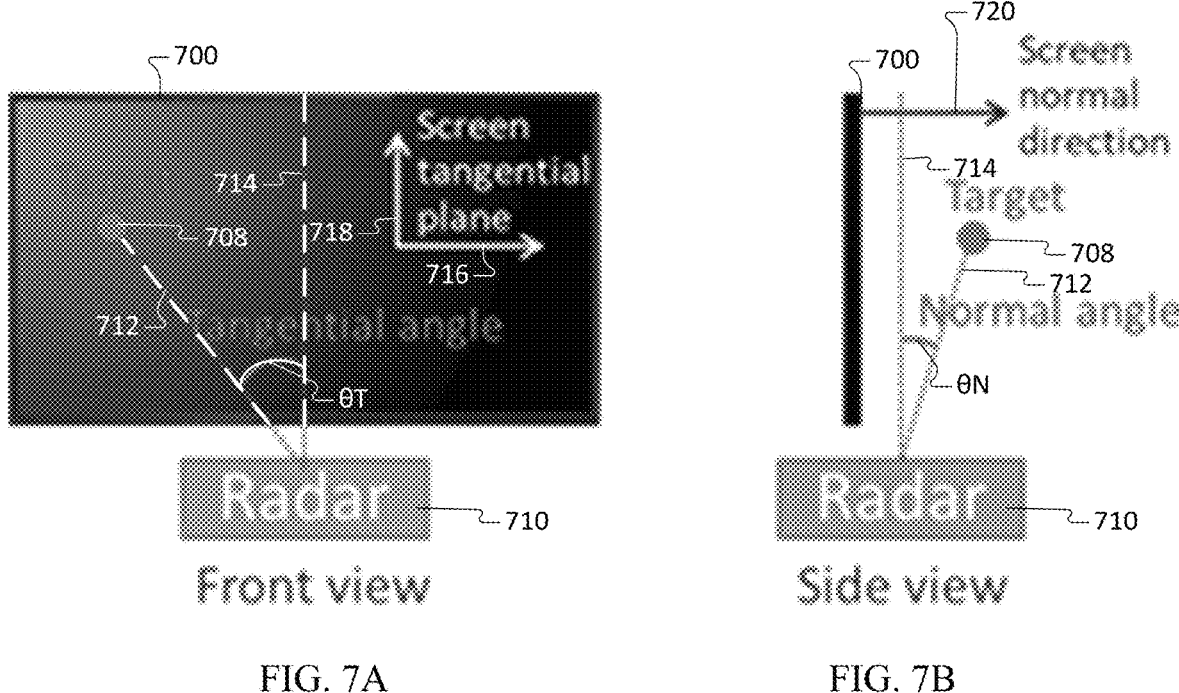
FIG. 7A                  FIG. 7B
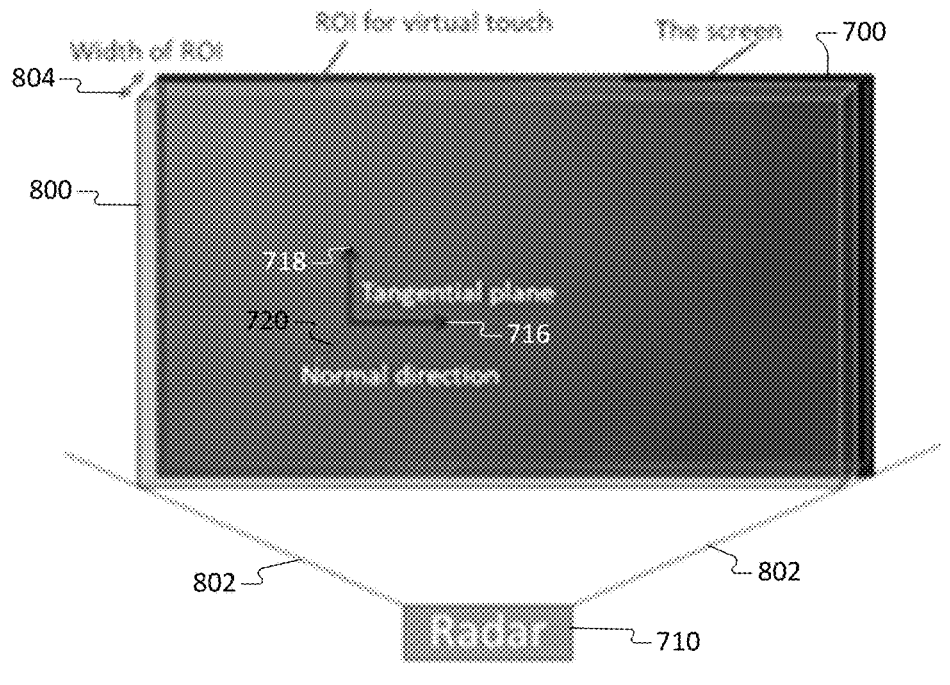
FIG. 8

VIRTUAL TOUCH INTERACTION FOR ANY DISPLAY DEVICES USING RADAR

CROSS-REFERENCE TO RELATED APPLICATION AND CLAIM OF PRIORITY

This application claims priority under 35 U.S.C. § 119 (e) to U.S. Provisional Patent Application No. 63/463,463 filed on May 2, 2023. The above-identified provisional patent application is hereby incorporated by reference in its entirety.

TECHNICAL FIELD

This disclosure relates generally to radar systems. More specifically, this disclosure relates to virtual touch interaction for any display device using radar.

BACKGROUND

An existing electronic display may not include capabilities for touch screen interaction. There are several existing solutions that could provide touch screen interaction to the existing electronic display or existing passive screen, but providing touch screen interaction could be costly, not scalable in terms of the screen size, and not portable when used as an add-on to the existing display. Conventional touch interaction for a display is provided by capacitive or resistive sensors. Resistive sensors are cheaper but less responsive, and resistive sensors are common choices as components for a point-of-sell terminal (e.g., a ticket vending machine). Capacitive sensors are more expensive, but more sensitive and more responsive to light touches, and capacitive sensors are typical choices as components of a smartphone. However, both options, capacitive sensors and resistive sensors, are not scalable in terms of the screen size. Also, a touchscreen display with large screen size can be very expensive, not portable (e.g., carried by a person). The capacitive sensors and resistive sensors are attached to the screen they are built for, and thus are not usable as an add-on to the existing display devices, and are not portable.

SUMMARY

This disclosure provides virtual touch interaction for any display device using radar.

In one embodiment, a method for virtual touch interaction with a display device is provided. The method is implemented by a processor operably connected to a transceiver that is configured to transmit and receive radar signals in a first field of view (FoV), and the method includes obtaining radar data based on the radar signals. The method includes, for each respective object among a set of objects detected: determining a set of parameters associated with the respective object, based on the radar signals. The set of parameters includes a normal angle of the respective object. The method includes, for each respective object among a set of objects detected: selecting the respective object as a target that is within a region-of-interest (ROI), in response to a determination that the set of parameters satisfy a definition of the ROI. The definition of the ROI is satisfied based on a determination that the normal angle of the respective object is within a normal-angle threshold interval. The method includes tracking a state of the target with respect to the ROI to detect one or more virtual interactions with a display area that is associated with an external display device and that overlaps the first FoV.

In another embodiment, an electronic device implementing methods for virtual touch interaction with a display device is provided. The electronic device includes a transceiver and a processor operably connected to the transceiver. The processor is configured to obtain radar data based on the radar signals. The processor is configured to, for each respective object among a set of objects detected: determine a set of parameters associated with the respective object, based on the radar signals. The set of parameters includes a normal angle of the respective object. The processor is configured to, for each respective object among a set of objects detected: select the respective object as a target that is within a region-of-interest (ROI), in response to a determination that the set of parameters satisfy a definition of the ROI. The definition of the ROI is satisfied based on a determination that the normal angle of the respective object is within a normal-angle threshold interval. The processor is configured to track a state of the target with respect to the ROI to detect one or more virtual interactions with a display area that is associated with an external display device and that overlaps the first FoV.

In yet another embodiment an electronic display device implementing methods for virtual touch interaction with a display device is provided. The electronic display device includes a display, a transceiver, and a processor operably connected to the display and the transceiver. The display is configured to output a graphical user interface (GUI) on a display area. The transceiver is configured to transmit and receive radar signals in a field of view (FoV) that overlaps the display area. The processor is configured to obtain radar data based on the radar signals. The processor is configured to, for each respective object among a set of objects detected: determine a set of parameters associated with the respective object, based on the radar signals. The set of parameters includes a normal angle of the respective object. The processor is configured to, for each respective object among a set of objects detected: select the respective object as a target that is within a region-of-interest (ROI), in response to a determination that the set of parameters satisfy a definition of the ROI. The definition of the ROI is satisfied based on a determination that the normal angle of the respective object is within a normal-angle threshold interval. The processor is configured to track a state of the target with respect to the ROI to detect one or more virtual interactions with the display area.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A, 2B, 2C, and 2D illustrate a field of view of a radar transceiver relative to a display area according to various hardware configurations of this disclosure;

FIG. 5 illustrates a hand of a user performing a virtual touch interaction with a graphical user interface (GUI) output by an electronic display device that has a screen below which a radar is positioned, according to this disclosure;

FIGS. 6A and 6B illustrate multiple examples of virtual click interactions, according to this disclosure;

FIG. 7A illustrates a tangential angle of the target, according to this disclosure;

FIG. 7B illustrates a normal angle of the target, according to this disclosure;

FIG. 8 illustrates a region of interest (ROI) for a virtual touch application, according to this disclosure;

DETAILED DESCRIPTION

Figure 1:
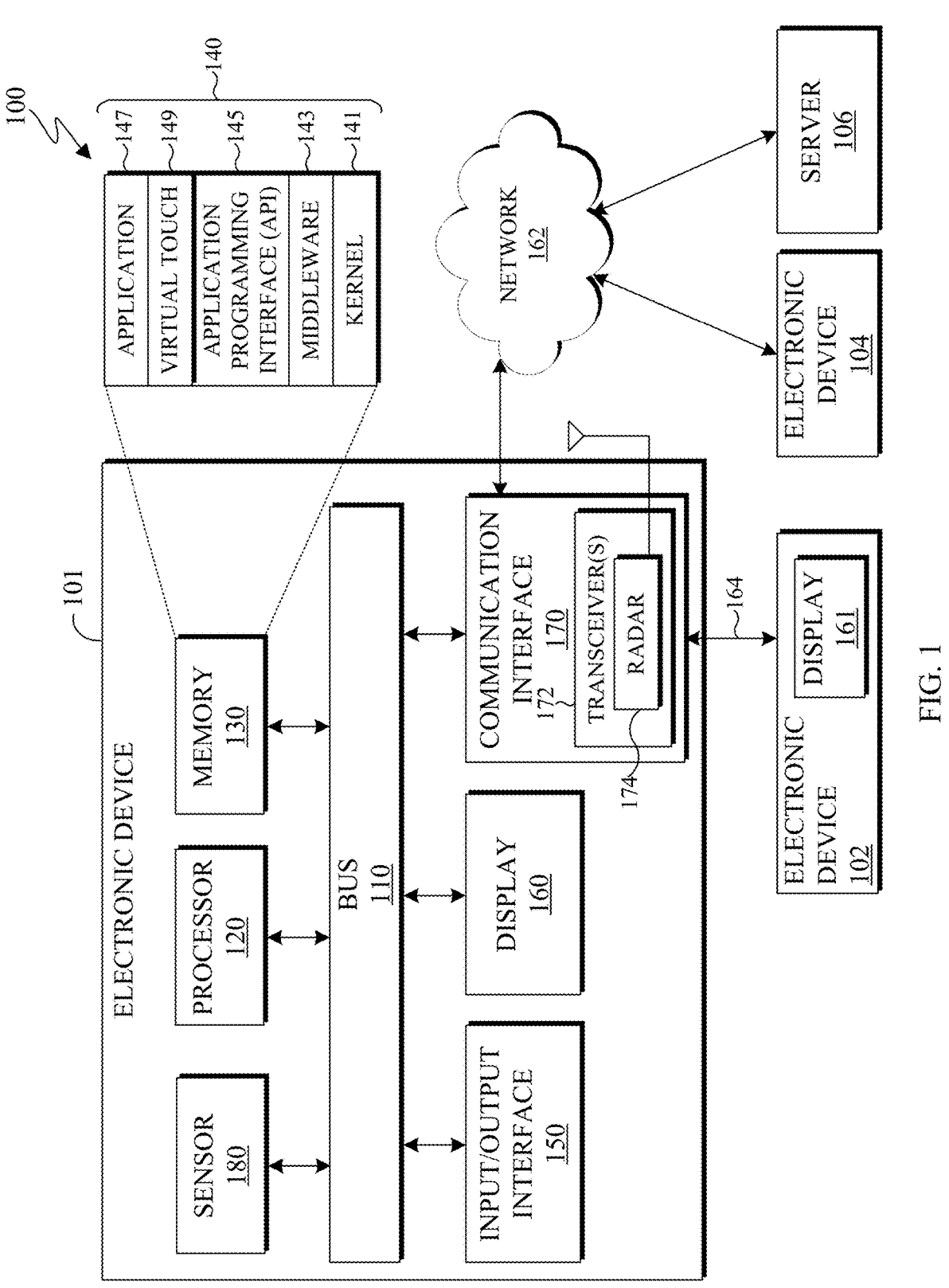
FIG. 1 illustrates an example network configuration including an electronic device according to this disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

For many uses for virtual touch screen, such as during a presentation, very precise interaction is often not required. For example, for a button push on a large display, centimeter-level of precision is more than enough, which is readily supportable by commercially available radars (e.g., a 60 GHz radar operating on 5 GHz bandwidth can support 3 cm range resolution).

The excellent target's range, angle, and speed detection capability of radar makes it a suitable sensing modality for providing cost-effective with small formed-factor solution (and thus easily portable) for providing virtual touch interaction. Radar's range resolution and angular resolution is limited by the available signal bandwidth and the antennas' dimension normalized by the wavelength of the carrier frequency. This makes radar operating at high frequencies such as millimeter wave (mmWave) and Terahertz wave (THz wave) very attractive as they can provide GHz of bandwidth (which can support centimeter or even millimeter level range resolution) as well as allowing a large number of antennas in reasonable form-factor sizes (which can provide high angular resolution). Such a virtual touch solution could be built into display devices or added as an accessory device to existing display devices or existing projector screens. In the case of the accessory device, the radar can be a stand-alone device or it can be some mobile device (e.g., like a smart phone) that has one or more radar sensors. Embodiments of this disclosure create a number of interesting use cases, or in other words, increase utility of the radar embedded in mobile devices.

One example of a use case is a feature for smart phone, wherein a phone with radar could be used to turn an existing display (e.g., a monitor) into a touch interactive display. This feature can be very useful for a small team discussion, where the user could use the virtual touch interaction to control the presentation material (e.g., moving the slides forward/backward, zooming some part, etc.)

Another example of a use case is a new accessory for turning any screen into a virtual touch screen: A standalone device could be commercialized for providing virtual touch interaction to any display. This can be a monitor size screen (e.g., like the use case with phone earlier) or it could be a larger scale screen such as a large size TV or even a screen (could be a wall) for a projector.

Yet another example of a use case is that a radar could be embedded to provide the virtual touch as a new feature for the TV or screen for projection: Rather than as an accessory, radar could be embedded into the body of the TV. For a passive screen like a wall, the radar could be embedded in the wall to provide virtual touch as a new feature.

Note that while this touch interaction might be less precise, it would be very low cost, and more scalable for large display sizes.

This disclosure provides a new radar-based application, where the range and angle resolution along with the Doppler detection capability are used to provide virtual touch interaction with any display device (which may include monitors, TVs, display screen, or even a wall or any projector screen).

Embodiments of this disclosure enable an on demand everywhere-and-intuitive interface for user in a smart-home (more broadly in ambient intelligence space). With embedded radars placed proximate to or on the walls and a projector that can rotate, embodiments of this disclosure can turn any of the walls in a home into a virtual touch screen that could allow users to interact with their smart home in an intuitive and natural way. Note that smart homes can benefit from this non-intrusive sensing solution that provides seamless interaction (e.g., by predicting user intention using sensing info). Embodiments of this disclosure provide easy and intuitive interaction that is well suited for such applications.

This disclosure describes a new way to use radar to provide touch interaction, including providing an intuitive add-on feature of virtual touch interaction to existing display devices that do not support touchscreens. The disclosed radar-based systems in this disclosure can also be used to provide virtual touch interaction to a passive display and even for some VR use cases. In the case of a radar-equipped accessory device or smartphone, the disclosed methods provide a portable touch interaction solution. When the radar is a built-in sensor on some mobile device (e.g., like a smartphone), the virtual touch interaction is another good utility that increases the value of having a radar sensor.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module. The electronic device 101 may also include a speaker and camera. In some embodiments, the electronic device 101 may exclude at least one of the components or may add another component.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for virtual touch interaction with a display device.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS). The applications 147 can include a multimedia player (such as a music player or a video player), a phone calling application, a virtual personal assistant, and the like. The applications 147 include a radar-based virtual touch interaction application 149 ("virtual touch" app 149), which is described more particularly below.

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions including virtual touch interaction with a display device as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external devices.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device. The communication interface 170 can be a wired transceiver or wireless transceiver or any other component for transmitting and receiving signals.

The first external electronic device 102 or the second external electronic device 104 may be a wearable device or an electronic device-mountable wearable device (such as a head mounted display (HMD)). When the electronic device 101 is mounted in an HMD (such as the first external electronic device 102), the electronic device 101 may detect the mounting in the HMD and operate in a virtual reality mode. When the electronic device 101 is mounted in the first external electronic device 102 (such as the HMD), the electronic device 101 may communicate with the first external electronic device 102 through the communication interface 170. The electronic device 101 may be directly connected with the electronic device 102 to communicate with the first external electronic device 102 without involving a separate network.

The wireless communication may use at least one of, for example, 5G/NR, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 164 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the external electronic devices 102 and 104 or server 106). Further, according to embodiments of this disclosure, when the electronic device 101 should perform some function or service automatically or at a request, the electronic device 101, instead of executing the function or service on its own or additionally, may request another device (such as external electronic devices 102 and 104 or server 106) to perform at least some functions associated therewith. The other electronic device (such as external electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the external electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The electronic device 101 as used herein includes one or more transceiver(s) 172 that can both transmit and receive radar signals. In this embodiment, one or more transceivers in the transceiver(s) 172 is a radar transceiver 174 that is configured to transmit and receive signals for detecting and ranging purposes and for virtual touch interaction purposes, as described more particularly below. The radar transceiver 174 is also referred to as a radar sensor. While FIG. 1 shows that the communication interface 170 includes the transceiver(s) 172, the radar transceiver 174 can be a separate component of the electronic device 101 that operates separate from the communication interface 170. For example, the radar transceiver 174 may be any type of transceiver including, but not limited to a WiFi transceiver, for example, an 802.11ay transceiver. The radar transceiver 174 can operate both radar and communication signals concurrently. The radar transceiver 174 includes one or more antenna arrays, or antenna pairs, that each includes a transmitter (or transmitter antenna) and a receiver (or receiver antenna). The radar transceiver 174 can transmit signals at various frequencies. For example, the radar transceiver 174 can transmit signals at frequencies including, but not limited to, 6 GHZ, 7 GHZ, 8 GHZ, 28 GHz, 39 GHz, 60 GHz, and 77 GHz. In some embodiments, the signals transmitted by the radar transceiver 174 can include, but are not limited to, millimeter wave (mmWave) signals. The radar transceiver 174 can receive the signals, which were originally transmitted from the radar transceiver 174, after the signals have bounced or reflected off of target objects in the surrounding environment of the electronic device 101. In some embodiments, the radar transceiver 174 can be associated with the I/O interface 150 to provide additional inputs to the processor 120.

In certain embodiments, the radar transceiver 174 can include a transmitter and a receiver. In the radar transceiver 174, the transmitter can transmit millimeter wave (mm- Wave) signals. In the radar transceiver 174, the receiver can receive the mmWave signals originally transmitted from the transmitter after the mmWave signals have bounced or reflected off of target objects in the surrounding environment of the electronic device 101. The processor 120 can analyze the time difference between when the mmWave signals are transmitted and received to measure the distance of the target objects from the electronic device 101. Based on the time differences, the processor 120 can generate an image of the object by mapping the various distances.

Figure 4:
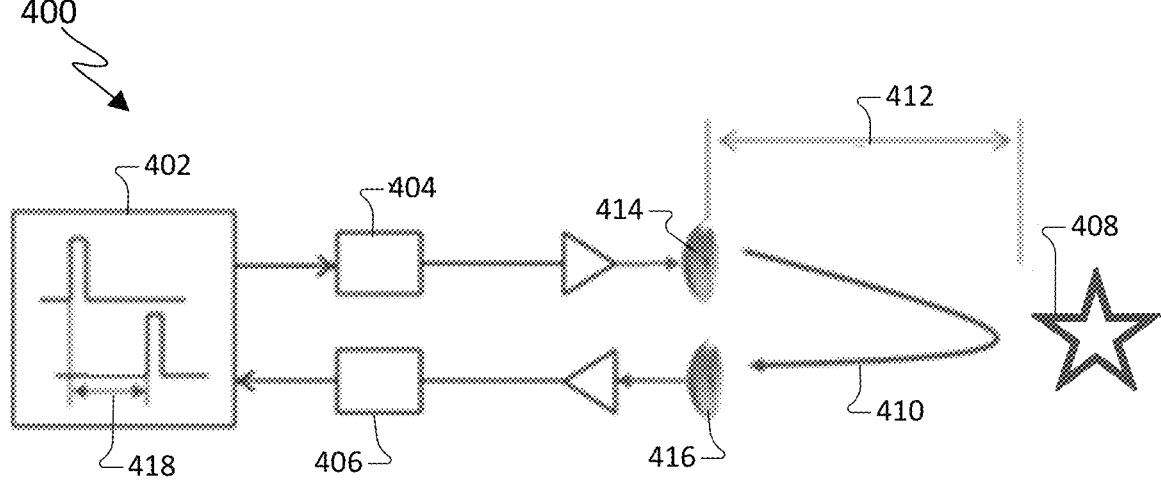
FIG. 4 illustrates an example architecture of a monostatic radar in an electronic device in accordance with an embodiment of this disclosure.

In certain embodiments, the radar transceiver 174 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 4, below, illustrates an example monostatic radar.

As introduced above, the virtual touch app 149 enables radar-based virtual touch interactions, according to the methods of this disclosure as described further below with FIGS. 9-21. The virtual touch app 149 could be used or executed in various hardware configurations (e.g., FIGS. 2A-2E) depending on how the radar transceiver 174 is interfaced with a controller of a display device. For simplicity, the controller of the display device can be referred to as an operating system (OS), as an OS includes a module to handle I/O devices such as an output device that is the display 160 or 161. In some hardware configurations, the radar transceiver 174 is interfaced with a controller of the display 160 that is part of the same electronic device 101 as the radar transceiver 174, and the virtual touch app 149 enables radar-based virtual touch interactions with the display 160. In other hardware configurations, the radar transceiver 174 is interfaced with a controller of the display 161 that is part of an external electronic device 102, and the virtual touch app 149 enables radar-based virtual touch interactions with the external display 161.

The server 106 may operate to drive the electronic device 101 by performing at least one of the operations (or functions) implemented on the electronic device 101. For example, the server 106 may include an event processing server module (not shown) that may support the event processing module implemented in the electronic device 101. The event processing server module may include at least one of the components of the event processing module and perform (or instead perform) at least one of the operations (or functions) conducted by the event processing module. The event processing module may process at least part of the information obtained from other elements (such as the processor 120, memory 130, input/output interface 150, or communication interface 170) and may provide the same to the user in various manners.

In some embodiments, the processor 120 is configured to communicate with the server 106 to download or stream multimedia content, such as images, video, or sound. For example, a user operating the electronic device 101 can open an application or website to stream multimedia content. The processor 120 can process and present information, via the display 160, to enable a user to search for content, select content, and view content. In response to the selections by the user, the server 106 can provide the content or record the search, selection, and viewing of the content, or both provide and record.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Further, while FIG. 1 illustrates one example of electronic device 101, various changes can be made to the electronic device 101. For example, various components 110-180 can be combined, further subdivided, or omitted and additional components can be added according to particular needs. As a particular example, the processor 120 can be divided into multiple processors, such as one or more central processing units (CPUs), one or more graphics processing units (GPUs), one or more neural processing units (NPUs), one or more neural networks, and the like. Also, the electronic device 101 can be configured to operate as a mobile telephone, tablet, smartphone, or as other types of mobile or stationary devices.

Figure 2E:
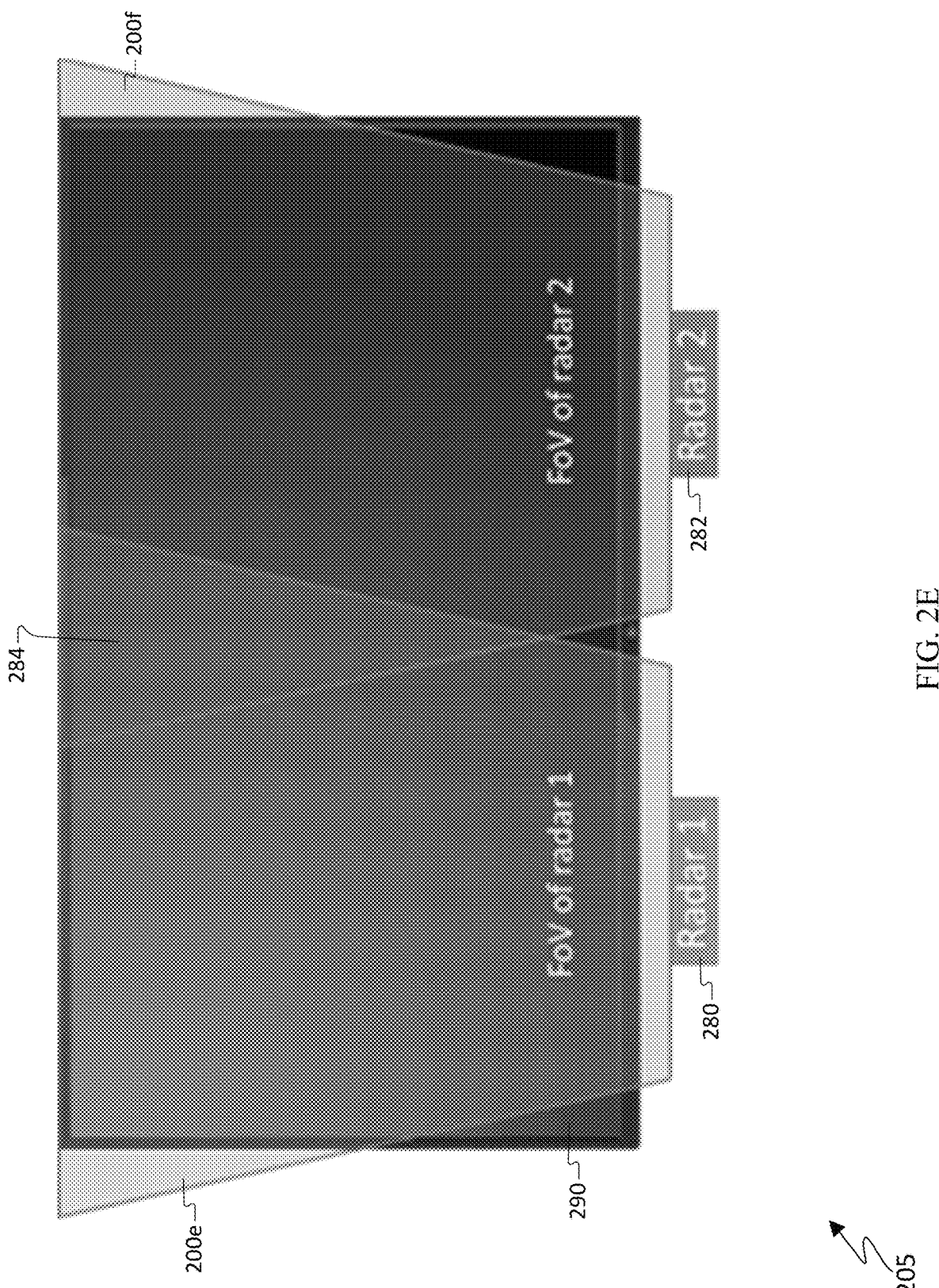
FIG. 2E illustrates multiple partially overlapping fields of view of multiple radar transceivers relative to a display area, according to a hardware configuration of this disclosure.

FIGS. 2A, 2B, and 2C illustrate a field of view 200a-200c of a radar transceiver relative to a display area according to various hardware configurations 201-203 of this disclosure. FIG. 2D illustrates a virtual touch sensing region 200d as a portion a field of view of a radar transceiver positioned relative to a display area according to a hardware configuration 204 of this disclosure. FIG. 2E illustrates multiple partially overlapping fields of view 200e-200f of multiple radar transceivers relative to a display area, according to a hardware configuration 205 of this disclosure. The display area could be provided by a television, a computer monitor, a projector, or a passive screen (for example, a wall). The embodiments of the various hardware configurations shown in FIGS. 2A-2E are for illustration only, and other embodiments could be used without departing from the scope of this disclosure. The various hardware configurations shown in FIGS. 2A-2E are different options for deployment as well as specific radar sensing and supportable forms of radar-based virtual touch interaction. Some of the hardware configurations shown in FIGS. 2A-2E exploit radar sensors within mobile devices such as a smartphone, tablet, etc.

More particularly, FIG. 2A illustrates a field of view 200a of a radar transceiver 206 relative to a display area 208 according to a hardware configuration 201 in which the radar transceiver 206 is included in an electronic display device 210. The electronic display device 210 includes the display area 208 and the radar transceiver 206 embedded within. For example, the electronic display device 210 can be a television with an embedded radar or a computer monitor with an embedded radar, according to this disclosure. The display area 208 can be a display screen or display surface that the electronic display device 210 includes for displaying a graphical user interface or visual content (e.g., television content). The electronic display device 210 and its components 206 and 208 can be the same as or similar to the electronic device 101 of FIG. 1 and its corresponding components 174 and 160.

Although one radar transceiver 206 is shown, the electronic display device 210 can include multiple radar transceivers 206 as built-in sensors of the display device. The electronic display device 210 can include a wired connection between the radar transceivers 206 and the controller of the display device. Each radar transceiver 206 can be installed in a fixed location with respect to the display area 208, which enables a coordinate mapping between coordinates of the radar 206 and coordinates of the display area 208 to be established from a factory without any need for user-aided calibration.

FIG. 2B illustrates a field of view 200b of a radar transceiver relative to a display area 218 according to a hardware configuration 202 in which the radar transceiver is included in an electronic device 230 positioned proximate to an external display device 220 that includes a display according to this disclosure. The external display device 220 and its components (including its OS and display area 218) can be the same as or similar to the external electronic device 102 of FIG. 1 and its corresponding components (including its OS and display 161). The electronic device 230 and its radar can be the same as or similar to the electronic device 101 of FIG. 1 and its corresponding radar 174.

The display area 218 can be a display screen or display surface that the external display device 220 includes for displaying a graphical user interface or visual content (e.g., television content). The display area 218 can be similar to the display area 208 of FIG. 2A.

The external display device 220 does not include built-in radar sensor(s). For example, the external display device 220 could be an existing display device without a radar transceiver, such as a television or computer monitor.

In this hardware configuration 202, the electronic device 230 includes a radar sensor (such as the radar transceiver 174 of FIG. 1) and is a standalone device that has a connection link 232 to the OS of the external display device 220. The connection link 232 can be a wired connection via a USB cable or a wireless connection via a wireless connectivity such as Bluetooth, WiFi, etc. The electronic device 230 can be a mobile device such as smartphone or tablet, a laptop, or other suitable device that includes a radar and ability to interface with the OS of the external display device 220. In the case where the radar is a built-in sensor in a mobile device, the electronic device 230 actually improves the utility of the mobile device and provides added value to the mobile device that includes the built-in radar. The radar sensor in the electronic device 230 acts as an external accessory to the external display device 220.

As standalone radar sensor, the electronic device 230 can be a new type of portable accessory that has radar sensing capability and can be used for providing virtual touch interactions with the external display area 218. In this hardware configuration 202, the relative position between the radar (230) and the screen (218) might not be known in advance, as such, a user-aided calibration procedure can be performed at the start of using the electronic device 230 to provide virtual touch interactions with the external display device 220. In some embodiments of the hardware configuration 202, a fixed installation position is used, such as when the electronic device 230 is installed into a mounting device that has a fixed location relative to the display area 218, and as a result, such a user-aided calibration procedure could be performed infrequently. Infrequent user-aided calibration procedure could be initiated by the electronic device 230 at the time of establishing the connection link 232, or could be initiated by the user when the user notices a mismatch in the coordinate translation between radar coordinates and display coordinates.

As a use case scenario for the hardware configuration 202, a user could be using a screen casting feature to display the contents of a smartphone on to a bigger display screen such as a monitor. In this use case scenario, the electronic device 230 is the smartphone 230, and the external display device 220 is the monitor 220, and the display area 218 is the bigger display screen 218. The smartphone 230 is placed with the edge 234 containing the radar facing upward so that the radar's FoV 200b overlaps with the screen 218 of the monitor 220, and the smartphone can provide virtual touch interactions. Processing of the virtual touch interactions can be performed by the processor 120 on the smartphone 230, as in this screen casting case, the OS that controls the display 218 resides on the smartphone 230 along with the radar (a built-in sensor). The smartphone 230 in this case is connected wirelessly to the external display device 220 for the screen casting.

FIG. 2C illustrates a field of view 200c of a radar transceiver (within a device 230) relative to a display area 248 that is associated with an external display device 240 and that overlaps the FoV 200c, according to a hardware configuration 203 in which the external display device ("projector") 240 projects a graphical user interface onto the display area 248 that is a passive screen (e.g., such as a surface of wall). For ease of description, the display area 248 is also referred to as the passive screen 248.

The hardware configuration 203 of FIG. 2C can include the same radar-equipped electronic device 230 of FIG. 2B, but in a different use case scenario. For ease of description, the electronic device 230 is referred to as smartphone 230, but embodiments of this disclosure include the electronic device 230 as any suitable device that includes a radar transceiver and ability to interface with an OS that outputs a source signal that the projector 240 projects.

In the hardware configuration 203 shown, a passive screen 248 is used with a projector 240. A smartphone 230 equipped with a radar sensor is used to provide virtual touch interactions to the passive display area 248. The smartphone 230 is wirelessly connected to another external electronic device 250, which can be a laptop computer referred to as laptop 250 for simplicity. Via a communication link 252, the smartphone 230 reports radar detection results or processed output in the form of virtual touch events to the laptop 250. The laptop 250 can respond to the virtual interaction events and can incorporate visual representations of the responses to the virtual interaction events in a GUI (or source signal for display) to be sent to the projector 240 for displaying on the passive screen 248.

The projector 240 receives a source signal from the display from the electronic device 230 or from another external electronic device 250. In the use case scenario shown, the projector 240 receives the source signal from another external electronic device 250 (e.g., laptop computer), and the electronic device 230 (e.g., smartphone) is connected to the other external electronic device 250 via the communication link 252. That is, the smartphone 230 is not directly connected to the projector 240, and the OS that controls the I/O resides within the laptop 250 in this case. From the perspective of the OS of the laptop 250, the smartphone 230 is an input device from which virtual touch events are received, and the projector 240 is an output device to which the source signal (or GUI) is sent. In response to receiving the source signal from the projector 240, the projector 240 emits light 242 corresponding to the source signal received.

In some embodiments of the hardware configuration 203, a fixed installation position is used, such as when the electronic device 230 is mounted to or embedded in a wall or floor for a fixed location relative to passive screen 248 with respect to a fixed location of a projector 240, and as a result, a user-aided calibration procedure could be performed formed infrequently. Infrequent user-aided calibration procedures could be performed at the time of installation of the projector 240, and then when there are changes to the location of the projector, such as when the user adjusts the projected display area 248.

FIG. 2D illustrates a virtual touch sensing region 200d that is a portion of a field of view of a radar transceiver 260 positioned relative to a display area associated with an extended reality (XR) device 270 according to a hardware configuration 204 in which the radar transceiver 260 is inside the XR device 270 according to this disclosure. Extended reality includes augmented reality (AR), virtual reality (VR), or mixed reality. The XR device 270 can be a XR headset that implements the virtual touch interaction using the radar transceiver 260 embedded in the XR device 270, which can be the same as the electronic device 101 of FIG. 1. For example, the processor 120 of FIG. 1 can represent the OS that controls the display output by the XR device 270. Alternatively, the XR device 270 can be a radar-equipped XR head mounted device (HMD), which can function as a placeholder device where a smartphone could be inserted to operate together as a VR headset (e.g., the cardboard VR headset).

The virtual touch sensing region 200d is a portion of the FoV of the radar 260 and can be defined as a thin slice of region along the horizontal plane of the FoV of the radar 260 as shown in FIG. 2D. The virtual touch sensing region 200d of this disclosure is not limited to being along the horizontal plane, as a vertical touch interaction region may also be used depending on the capability of the radar 260 in providing sharp beams along the corresponding dimension. While this use case is different in that the screen in this case is virtual, the hardware configuration is the same as the case of using a mobile device (equipped with radar) with a display device similar to FIG. 2B.

Alternatively, the hardware configuration 204 can include another embodiment in which the XR device 270 is a head mounted device (HMD) that includes a slot 272 configured for insertion of a radar-equipped electronic accessory device that includes the radar transceiver 260. The radar-equipped electronic accessory device that includes the radar transceiver 260 is not limited to being a smartphone with a built-in radar sensor, similar to the electronic device 230 of FIGS. 2B and 2C. For example, the radar-equipped electronic accessory device can be the radar transceiver 260 with an I/O interface configured to connect (e.g., physically attach, or couple wirelessly or via wire) to a corresponding I/O interface of the XR device 270, which can be an external display device. The I/O interface of the XR device 270 can be accessible via the slot 272 proximate to the front of the body of the XR device 270.

In the scenario in which the radar 260 is a component of a smartphone, the radar 260 can be located along the top edge of the smartphone. Virtual objects 274a-274b can then be presented to the user with distances of the virtual objects 274a-274b defined in this horizontal plane of the virtual touch interaction sensing region 200d. The virtual objects 274a-274b could be buttons for navigation, or virtual objects associated with gaming applications, etc. The front face of the XR device 270 can include a hole 276 through which a portion of the smartphone (or radar-equipped electronic accessory device inserted in the slot 272) is exposed to the outside, such that an image sensor lens of the smartphone is exposed to the outside. Depending on the material of the HMD, such a physical opening might or might not be necessary. For example, radar signals could propagate quite well through some materials such as plastic, but would not work through metal.

FIG. 2E illustrates multiple partially overlapping fields of view 200e and 200f of multiple radar transceivers 280 and 282 relative to a display area 290, according to a hardware configuration of this disclosure.

Depending on the screen size and the placement of the radars 280 and 282, the overlap between one radar FoV 200e and the screen (i.e., display area 290) might not be enough to provide a satisfactory virtual touch interaction experience. This inadequate overlap issue can be resolved by using multiple radars 280 and 282 together so that the union of corresponding fields of view 200e-200f would cover most or all of the screen. The multiple radars 280 and 282 expand the coverage of the ROI to include most or all of the display area 290, which can be defined by the dimensions of the screen. In this example, one radar FoV only covers approximately half of the screen (e.g., half of display area 290), yet with two radars 280 and 282, most of the screen is covered (e.g., overlapped) by the union of the two corresponding fields of view 200e-200f. An overlap region 284 exists where a first FoV 200e of a first radar 280 overlaps or coincides with a second FoV 200f of a second radar 282. Note that while the example in FIG. 2E only shows two radars 280 and 282, depending on the screen size and the radars' fields of view, more than two radars could be concurrently utilized or united.

Figure 3:
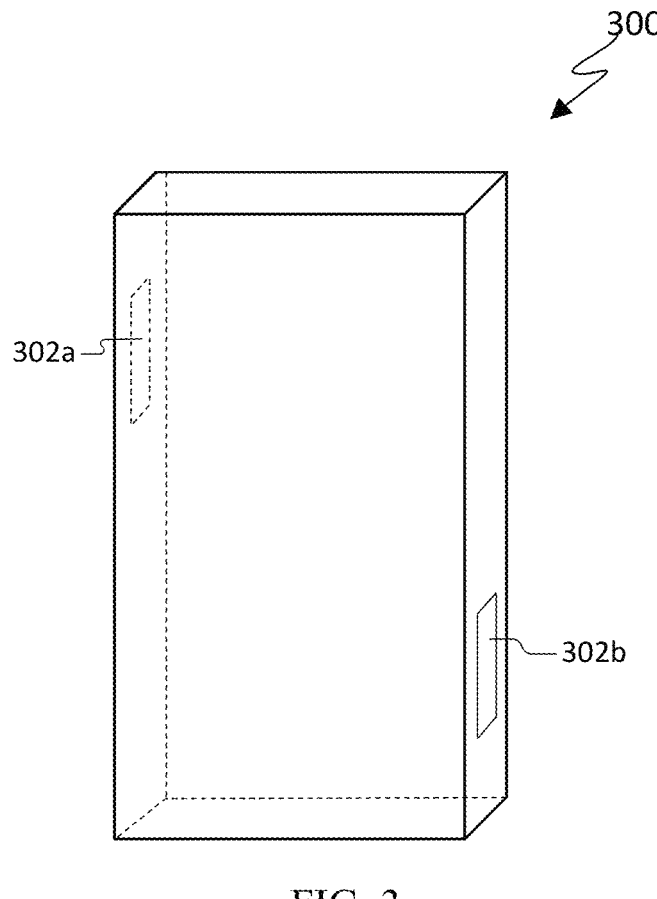
FIG. 3 illustrates a three-dimensional view of an example electronic device that includes multiple millimeter wave (mmWave) antenna modules in accordance with an embodiment of this disclosure.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the electronic device 101 in FIG. 1, the electronic device 210 in FIG. 2A, electronic device 230 in FIGS. 2B and 2C, the hardware configuration 204 in FIG. 2D, or the radars 280 or 282 of FIG. 2E. The embodiment of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302a and the second antenna module 302b are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 120 of FIG. 1), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming.

FIG. 4 illustrates an example architecture of a monostatic radar in an electronic device 400 in accordance with an embodiment of this disclosure. The embodiments of the architecture of the monostatic radar illustrated in FIG. 4 are for illustration only, and other embodiments can be used without departing from the scope of the present disclosure.

The electronic device 400 that includes a processor 402, a transmitter 404, and a receiver 406. The electronic device 400 can be similar to any of the electronic device 101 in FIG. 1, the electronic device 210 in FIG. 2A, electronic device 230 in FIGS. 2B and 2C, the hardware configuration 204 in FIG. 2D, or the radars 280 or 282 of FIG. 2E, or the electronic device 300 of FIG. 3. The processor 402 is similar to the processor 120 of FIG. 1. Additionally, the transmitter 404 and the receiver 406 can be included within the radar transceiver 274 of FIG. 1, the radar transceiver 206 of FIG. 2A, any radar transceiver within the radar-equipped electronic device 230 of FIGS. 2B-2C, the radar transceiver 260, 280, and 282 of FIGS. 2D and 2E, or the antenna module 302 of FIG. 3. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off the target object 408 and is received by the receiver 406 as a delayed echo, via a receive antenna 416. The signal 410 represents one or many signals that can be transmitted from the transmitter 404 and reflected off the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving. As described herein, the electronic device 400 that includes the architecture of a monostatic radar is also referred to as a radar 400.

The signal 410 can be a radar pulse as a realization of a desired "radar waveform," modulated onto a radio carrier frequency. The transmitter 404 transmits the radar pulse signal 410 through a power amplifier and transmit antenna 414, either omni-directionally or focused into a particular direction. A target (such as target 408), at a distance 412 from the location of the radar (e.g., location of the transmit antenna 414) and within the field-of-view of the transmitted signal 410, will be illuminated by RF power density $p_t$ (in units of W/m2) for the duration of the transmission of the radar pulse. Herein, the distance 412 from the location of the radar to the location of the target 408 is simply referred to as "R" or as the "target distance." To first order, $p_t$ can be described by Equation 1, where Pr represents transmit power in units of watts (W), GT represents transmit antenna gain in units of decibels relative to isotropic (dBi), $A_T$ represents effective aperture area in units of square meters (m2), and $\lambda$ represents wavelength of the radar signal RF carrier signal in units of meters. In Equation 1, effects of atmospheric attenuation, multi-path propagation, antenna losses, etc. have been neglected.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \qquad (1)$$

The transmit power density impinging onto the surface of the target will reflect into the form of reflections depending on the material composition, surface shape, and dielectric behavior at the frequency of the radar signal. Note that off-direction scattered signals are typically too weak to be received back at the radar receiver (such as receive antenna 416 of FIG. 4), so typically, only direct reflections will contribute to a detectable receive signal. In essence, the illuminated area(s) of the target with normal vectors pointing back at the receiver will act as transmit antenna apertures with directivities (gains) in accordance with corresponding effective aperture area(s). The power of the reflections, such as direct reflections reflected and received back at the radar receiver, can be described by Equation 2, where $P_{refl}$ represents effective (isotropic) target-reflected power in units of watts, $A_t$ represents effective target area normal to the radar direction in units of m2, $G_t$ represents corresponding aperture gain in units of dBi, and RCS represents radar cross section in units of square meters. Also in Equation 2, $r_t$ represents reflectivity of the material and shape, is unitless, and has a value between zero and one inclusively ([0, . . . , 1]). The RCS is an equivalent area that scales proportional to the actual reflecting area-squared, inversely proportional with the wavelength-squared, and is reduced by various shape factors and the reflectivity of the material itself. For a flat, fully reflecting mirror of area $A_t$, large compared with $\lambda 2$, $$RCS = 4\pi A_t^2/\lambda^2.$$

Due to the material and shape dependency, it is generally not possible to deduce the actual physical area of a target from the reflected power, even if the target distance R is known. Hence, the existence of stealth objects that choose material absorption and shape characteristics carefully for minimum RCS.

$$P_{refl} = p_t A_t G_t \sim p_t A_t r_t \frac{A_t}{(\lambda^2/4\pi)} = p_t RCS \qquad (2)$$

The target-reflected power ($P_R$) at the location of the receiver results from the reflected-power density at the reverse distance R, collected over the receiver antenna aperture area. For example, the target-reflected power ($P_R$) at the location of the receiver can be described by Equation 3, where $A_R$ represents the receiver antenna effective aperture area in units of square meters. In certain embodiments, $A_R$ may be the same as $A_T$.

$$P_R = \frac{P_{refl}}{4\pi R^2} A_R = P_T \cdot RCS \frac{A_T A_R}{4\pi\lambda^2 R^4} \qquad (3)$$

The target distance R sensed by the radar 400 is usable (for example, reliably accurate) as long as the receiver signal exhibits sufficient signal-to-noise ratio (SNR), the particular value of which depends on the waveform and detection method used by the radar 500 to sense the target distance. The SNR can be expressed by Equation 4, where k represents Boltzmann's constant, T represents temperature, and kT is in units of W/Hz]. In Equation 4, B represents bandwidth of the radar signal in units of Hertz (Hz), F represents receiver noise factor. The receiver noise factor represents degradation of receive signal SNR due to noise contributions of the receiver circuit itself.

$$SNR = \frac{P_R}{kT \cdot B \cdot F} \qquad (4)$$

If the radar signal is a short pulse of duration $T_p$ (also referred to as pulse width), the delay $\tau$ between the transmission and reception of the corresponding echo can be expressed according to Equation 5, where c is the speed of (light) propagation in the medium (air).

$$\tau = 2R/c \qquad (5)$$

In a scenario in which several targets are located at slightly different distances from the radar 400, the individual echoes can be distinguished as such if the delays differ by at least one pulse width. Hence, the range resolution ($A_R$) of the radar 400 can be expressed according to Equation 6.

$$\Delta R = c\Delta\tau/2 = cT_P/2 \qquad (6)$$

If the radar signal is a rectangular pulse of duration $T_p$, the rectangular pulse exhibits a power spectral density P($f$) expressed according to Equation 7. The rectangular pulse has a first null at its bandwidth B, which can be expressed according to Equation 8. The range resolution $\Delta R$ of the radar 400 is fundamentally connected with the bandwidth of the radar waveform, as expressed in Equation 9.

$$P(f) \sim \left(\sin(\pi f T_P)/(\pi f T_P)\right)^2 \qquad (7)$$

$$B = 1/T_P \qquad (8)$$

$$\Delta R = c/2B \qquad (9)$$

Although FIG. 4 illustrates one example radar 400, various changes can be made to FIG. 4. For example, the radar 400 could include hardware implementing a monostatic radar with 5G communication radio, and the radar can utilize a 5G waveform according to particular needs. In another example, the radar 400 could include hardware implementing a standalone radar, in which case, the radar transmits its own waveform (such as a chirp) on non-5G frequency bands such as the 24 GHz industrial, scientific and medical (ISM) band. In another particular example, the radar 400 could include hardware of a 5G communication radio that is configured to detect nearby objects, namely, the 5G communication radio has a radar detection capability.

FIG. 5 illustrates a hand 510 of a user performing a virtual touch interaction with a graphical user interface (GUI) 520 output by an electronic display device that has a screen 530 below which a radar 540 is positioned, according to this disclosure. The embodiment of the virtual touch interaction with the GUI 520 shown in FIG. 5 is for illustration only, and other embodiments could be used without departing from the scope of this disclosure.

The GUI 520 of FIG. 5 can be displayed on any of the displays 160 and 161 of FIG. 1, any of the display areas 208, 218, 248, or 290 of FIGS. 2A-2C and 2E. The buttons 522-524 within the GUI 520 can be displayed as the virtual objects 274a-274b of FIG. 2D. The radar 540 can include the antenna module 302 of FIG. 3 or the transmitter 404 and the receiver 406 of FIG. 4. The radar 540 can be similar to the radar transceiver 174 of FIG. 1, the radar transceiver 206 of FIG. 2A, any radar transceiver within the radar-equipped electronic device 230 of FIGS. 2B-2C, or the radar transceiver 260, 280, and 282 of FIGS. 2D and 2E. The radar 540 shown at the bottom of the screen 530 could be built into the body of the display device or could be a standalone radar device that could be connected to the display device using a wireless technology such as WiFi or Bluetooth. That is, the hardware configuration shown in FIG. 5 can be similar to the hardware configurations of 201-203 of FIGS. 2A-2C.

The radar 540 can be configured to form sharp beams that can be used to constrain the detection region 542 to be a thin region near the screen 530. The detection region 542 is shown as a translucent trapezoid for ease of illustration. At high frequencies, such as mmWave and THz frequencies, a form-factor of a few centimeters can accommodate tens of antennas, which can support high angular resolution. The excellent ranging and high angular resolution of the radar 540 are useful for determining the precise location of the hand 510 in the sensing detection region 542. This helps support accurate touch interaction that improves user experience.

The processor corresponding to the radar 540, such as the processor 120 of FIG. 1, executes Doppler processing to filter out irrelevant static objects such as the body of the display device that includes the screen 530. Doppler processing can be used to detect a virtual click event or virtual swipe event to support virtual touch functionality. The processor corresponding to the radar 540 executes a pipeline method for radar-based virtual interaction with a display device, as described further below. Also, the processor corresponding to the radar 540 executes multiple options for tracking the state of each target within a ROI to detect one or more virtual interactions with the display device.

In some embodiments, a virtual click event occurs when the position of the hand 510 within the detection region 542 overlaps the position of at least one button 522-524, regardless of where the hand 510 entered the detection region. In some embodiments, a virtual click event occurs when the position of at least one button 522-524 is overlapped by a specific position where the hand 510 enters (and/or exits) the detection region 542.

FIGS. 6A and 6B illustrate multiple examples of virtual click interactions, according to this disclosure. FIG. 6A illustrates a virtual click interaction that includes a sequence of an up-tapping gesture 610 and a down-tapping gesture 620, according to this disclosure. FIG. 6B illustrates a virtual click interaction that includes a grabbing gesture 640, according to this disclosure. The embodiments of the virtual click interactions 610, 620, 640 shown in FIGS. 6A and 6B are for illustration only, and other embodiments could be used without departing from the scope of this disclosure. For ease of description, the screen 530 of FIG. 5 is the same as the screen of FIGS. 6A and 6B.

Refer to FIG. 6A. The up-tapping gesture 610 begins at a first-hand position 605 in which the palm of the hand spread across a plane that is orthogonal to the screen 530. The up-tapping gesture 610 ends at a second hand position 615 with the palm of the hand spread across another plane that is parallel to the screen 530. In the first hand position 605, the palm is facing down towards the floor, and the fingertips are facing the screen 530. Then in the second hand position 615, the up-tapping gesture 610 ends with the palm facing the screen 530, and the fingertips are facing up towards the ceiling. The arrow 625 represents motion of the hand transitioning from a down-facing palm to a screen-facing palm.

The down-tapping gesture 620 is the reverse of the up-tapping gesture 610. That is, the down-tapping gesture 620 begins at the second hand position 615, and then ends at the first hand position. The arrow 630 represents motion of the hand transitioning from a screen-facing palm to a down-facing palm.

Refer to FIG. 6B. The grabbing gesture 640 begins at the second hand position 615, and ends at a third hand position 645 with a closed fist. The arrow 650 represents motion of the hand transitioning from a screen-facing palm to a closed fist.

FIGS. 7A and 7B (together referred to as FIG. 7) show a front view and a side view of screen 700 of an electronic display device, respectively. FIG. 7A illustrates a tangential angle $\theta T$ of the target 708 in a tangential plane defined by the screen 700, according to this disclosure. FIG. 7B illustrates a normal angle $\theta N$ of the target 708 relative to a direction normal to the screen 700, according to this disclosure. The embodiments of the tangential and normal angles $\theta T$ and ON shown in FIG. 7 are for illustration only, and other embodiments could be used without departing from the scope of this disclosure.

The screen 700 can represent the displays 160 and 161 of FIG. 1, any of the display areas 208, 218, 248, or 290 of FIGS. 2A-2C and 2E, or the screen 530 of FIG. 5. The distance 712 from the radar 710 to the target 708 can be similar to the distance 412 of FIG. 4. The distance 712 can be measured from the radar 710, as a reference point.

A reference axis 714 extends from the reference point at the radar 710. For example, the reference point (from which the reference axis 714 extends) can be the boresight of the radar 710. The reference axis 714 corresponds to 90 degrees relative to the normal direction of the screen surface, and is a line parallel to the screen 700 in the side view of FIG. 7B. The reference axis 714 extends vertically relative to the front view of the screen 700 of FIG. 7A.

In this disclosure, the plane of the screen 700 is referred to as the tangential plane. The directions within the plane of the screen 700 are referred to as tangential directions 716 and 718, and the direction normal (perpendicular) to the screen 700 is referred to as the normal direction 720. Rather than using azimuth and elevation, this disclosure defines the target normal angle $\theta N$ as the angle along the normal direction 720 of the screen 700, and defines the target tangential angle $\theta T$ as the angle along the horizontal direction 716 in the tangential plane.

FIG. 8 illustrates a region of interest (ROI) 800 for a virtual touch application, according to this disclosure. The embodiment of the ROI 800 shown in FIG. 8 is for illustration only, and other embodiments could be used without departing from the scope of this disclosure.

For ease of description, the screen 700, radar 710, horizontal direction 716, vertical direction 718, and normal direction 720 of FIG. 7 are also shown in FIG. 8. The radar 710 can be located at the bottom, at the top, or at a side of the screen. In the example shown, the radar 710 is placed at the bottom of the screen 700 and has a field of view 802 that covers an entirety of the screen 700.

The virtual touch interaction app 149 uses the ROI 800 for detection of a target (such as the target 708) and motion of the target. The ROI 800 is a translucent parallelepiped, for ease of illustration. The ROI 800 can be a thin slice in the shape of a parallelepiped, positioned immediately in front of the screen 700. That is, the width 804 of the ROI 800 is relatively thin, such as within a few centimeters (e.g., up to approximately 10 cm). The radar 710 hardware and processing software (e.g., virtual touch app 149) can be designed such that only objects (e.g., a hand) within this ROI 800 will be determined as valid targets for the purpose of virtual touch interaction. In general, the term target is often used to refer to an object that a radar detected within the FoV of the radar. However, in this disclosure, a valid target is an object that the radar detected within the ROI, such as within the ROI 800, which is a subpart (less than) the FoV 802.

In some scenarios, such as the XR headset hardware configuration 204 in FIG. 2D, an ROI can be defined similarly as the ROI 800. One difference from ROI 800 and the ROI in the XR headset hardware configuration 204 is that the display in the XR headset hardware configuration 204 is a virtual display in 3D that would require the correct rendering of the virtual touch interaction in the virtual 3D display. Embodiments of this disclosure are based on an assumption that this correct rendering is properly handled by the virtual reality applications. For example, when the buttons 522-524 within the GUI 520 are displayed as the virtual objects 274a-274b of FIG. 2D, then a hand of the user can be detected as a target within the virtual touch sensing region 200d. For simplicity, this disclosure uses the physical screen 700 use case as an example, but the disclosed embodiments can be readily applied to the virtual touch interaction for the use case of the XR headset hardware configuration 204.

In some scenarios, a radar can have different capabilities (e.g., narrower field of view) than the radar 710. Depending on the radar FoV and the relative placement of a radar with respect to the screen 700, another ROI might not cover the whole screen, but instead covers part of the screen 700 and leaves a remaining part of the screen 700 as not covered. This issue of a FoV of a single radar being unable to cover the whole screen can be mitigated by operating multiple radars placed strategically (as shown in the hardware configuration 205 of FIG. 2E) to improve the overlap of the screen and the united FoV (200e-200f) of the multiple radars.

In FIGS. 9-21, each method is implemented by an electronic device, such as the electronic device 101 of FIG. 1. More particularly, each method of FIGS. 9-21 is performed by a processor 120 of the electronic device 101 executing virtual touch app 149. For ease of explanation, each method of FIGS. 9-21 is described as being performed by the processor 120.

Figures 9, 10:
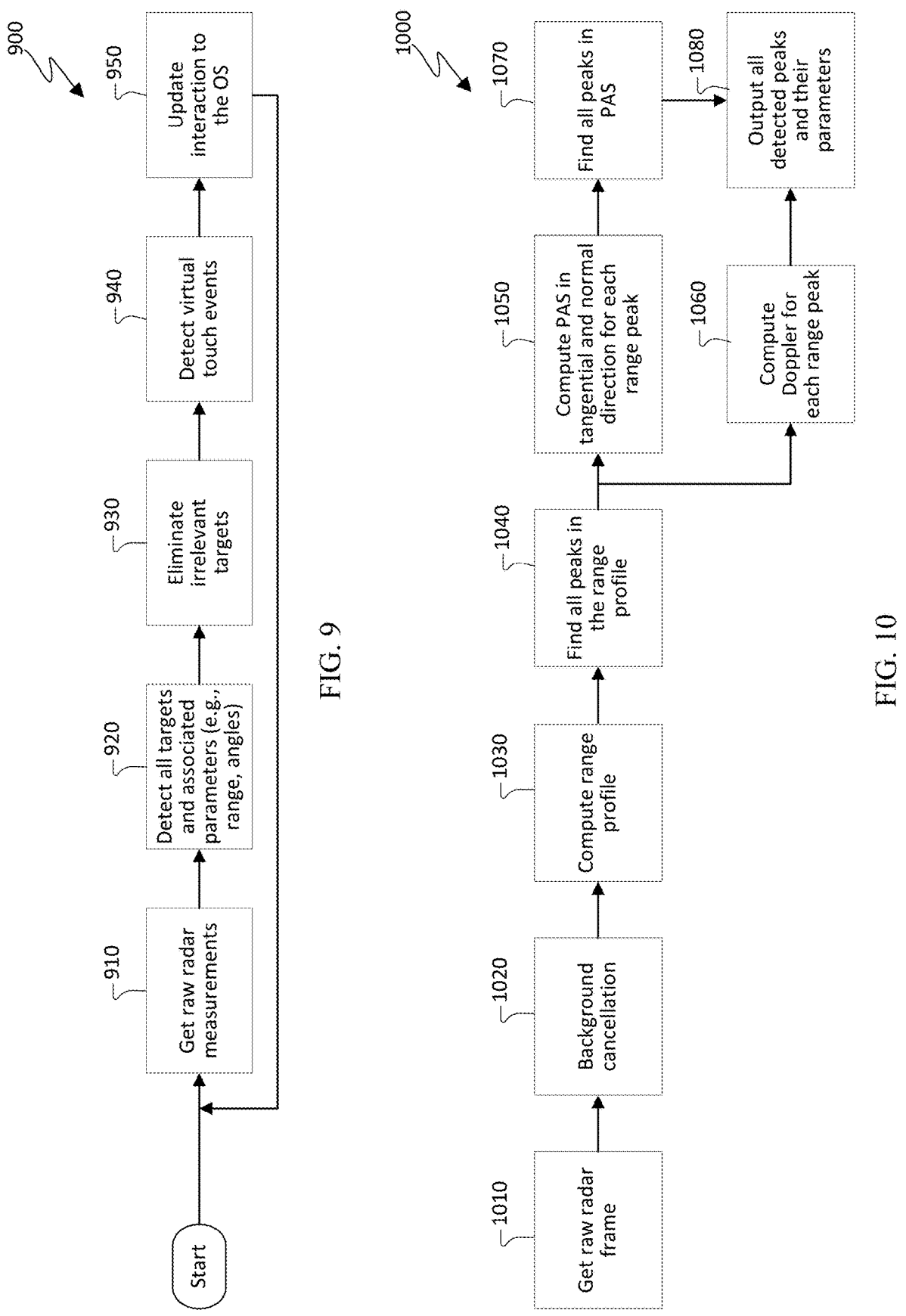
FIG. 9 illustrates a method for a radar-based virtual touch interaction application, according to this disclosure.
FIG. 10 illustrates a method to detect a set of objects and determine a set of associated parameters for each respective object among the set of objects detected, according to this disclosure.

FIG. 9 illustrates a method 900 for a radar-based virtual touch interaction application 149, according to this disclosure. The embodiment of the method 900 shown in FIG. 9 is for illustration only, and other embodiments could be used without departing from the scope of this disclosure.

At block 910, the processor 120 obtains raw radar measurements. For example, the processor 120 can use at least one transceiver 172 to transmit and receive radar signals in at least one corresponding field of view (FoV). As an example of radar measurements, the radar signal 410 is shown in FIG. 4.

Blocks 920, 930, and 940 are three main functional blocks that together represent the radar processing for virtual touch interactions. First, at block 920, the processor 120 detects a set of objects and associated parameters for each of the objects, based on the radar measurements. That is, the processor 120 tries to detect all objects within the FoV of the radar transceiver 174. The target 408 shown in FIG. 4 is an example of a target detected within the field of view of the radar 400. Parameters associated with the detected object include a range (such as the target distance 412 or 712 of FIGS. 4 and 7) and angles, such as the tangential angle $\theta T$ and normal angle $\theta N$ of FIG. 7. Parameters associated with the detected object also include Doppler (e.g., speed). Additional details of performing target detection and estimating the parameters of each target are described further below with FIG. 10.

Second, at block 930, the processor 120 eliminates (for example, discards) irrelevant objects. From among the set of objects detected, irrelevant objects are detected outside the ROI. Because the radar FoV and the ROI are not the same (i.e., are not equivalent), the processor 120 applies filtering to the obtained radar measurements to eliminate irrelevant targets (i.e., detected within the FoV of the radar) and to only keep those objects within the ROI. The detected parameters (previously detected from block 920) associated with a detected object could be used for determining if the object is relevant or not. To reduce a boundary effect, the processor 120 can track targets and their history (e.g., historical parameter values) along with the currently detected parameters, which can be used to determine if the target is relevant or not.

Third, at block 940, the processor 120 detects virtual touch events. That is, all virtual touch events that the processor 120 detects are from among the relevant targets (i.e., valid targets) and their associated parameters (current and/or historical). Note that the types of virtual touch events/interactions could be defined differently depending on a design choice of the interface, described further below as Option 1 and Option 2.

At block 950, the processor 120 sends (e.g., outputs) to the OS an update of the virtual touch interaction. That is, radar detection output is sent from the processor 120 to the OS that is the controller of the display device.

In its pure form, a radar can be used to detect a target distance (or range), angle, and speed of a target. These detected parameters need to be further processed to be used for providing virtual touch interactions. This disclosure provides several options for this further processing and the supportable virtual touch interactions. This method 900 provides multiple radar detection output options, referred to as Option 1 and Option 2. In the case of Option 1, parameters associated a detected target are used to determine the target's position projected (for example, translated) onto the tangential plane (if not already translated), and those translated parameters are output to the OS. That is, the processor 120 outputs the location of the target in the tangential plane of the ROI 800, which is parallel to the display screen 700. In this Option 1, the virtual touch event that a target is detected within the ROI is interpreted (by the OS) as equivalent to a physical touch event of a conventional touch screen at the position of the detected target.

In the case of Option 2, the translated parameters associated a detected target are still output to the OS, but also, additional events (referred to as explicit touch events) are explicitly detected. That is, the processor 120 outputs the location of the target in the tangential plane of the ROI 800 and some detected interaction events. In this Option 2, a target merely being detected within the ROI 800 is not considered a touch event; a virtual touch event requires that an explicit touch event be detected. Some examples of those explicit touch events include click events, swipe/scroll events (which are the same motion-wise, but with different contexts), drag and drop, zooming, etc. To detect a virtual touch event in the Option 2, an example explicit touch event could be associated with a hand-tapping motion, which could be reliably detected using Doppler processing. The explicit touch event of Option 2 can be analogized with a cursor of a mouse moving around on the screen versus the action of clicking. The cursor displayed on the screen can be interpreted as equivalent to the target (e.g., user's hand) being detected within the ROI 800. The cursor moving around on the screen 700 can be interpreted as equivalent to target motion within the ROI 800. The action of clicking the mouse button can be interpreted as equivalent to the hand-tapping action assigned to the explicit touch event.

A designer of an application (such as applications 147 and 149) can choose between these multiple (two) radar detection output options and can make the design choice base on a targeted interaction design (e.g., from the user experience point of view associated with the intended applications) or from the capability of the radar. Particularly, a radar capability-based design choice can be made with regard to the required reliability for detecting whether there is a target (i.e., the user's hand) within the ROI. By having the explicit touch event of Option 2, the reliability requirement of the detection of targets within the ROI is more relaxed compared to Option 1.

FIG. 10 illustrates a method 1000 to detect a set of objects and determine a set of associated parameters for each respective object among the set of objects detected, according to this disclosure. The embodiment of the method 1000 shown in FIG. 10 is for illustration only, and other embodiments could be used without departing from the scope of this disclosure. The procedures of blocks 1010-1080 can be the procedures of block 920 of FIG. 9.

At block 1010, raw measurements corresponding to a radar frame are obtained (e.g., fetched). A radar frame can be defined as a processing unit for the radar, rather than processing a set of single pulse measurements as the processing unit for the radar. The term "set" as used in the "set of single pulse measurements" refers to measurements across all the TX-RX pairs of the antenna, which may happen simultaneously or sequentially depending on the radar implementation. By executing frame-processing (e.g., processing a radar frame followed by another radar frame), expect gains in the detection performance can be expected. For example, an increase in the signal to noise ratio (SNR) and the ability to use more advanced angle estimation methods (such as MUSIC) that require the spatial covariance matrix can be utilized with frame-processing to improve detection performance.

At block 1020, the processor 120 performs background cancellation. For the purpose of this detection, static objects such as the body of the screen as well as nearby static objects are not of interest. The desired targets (e.g., targets of interest) are the user's hands (or other substitute pointer objects if those are used) which will have movement during the virtual touch action. Embodiments of this disclosure are based on an assumption that a human hand cannot be completely static, especially during the virtual touch interaction. There are different ways that the processor 120 can perform background cancellation, which may include background subtraction methods, or Doppler processing methods.

In the case of background subtraction methods, it is assumed that a reference background measurement is available. The reference measurement is used to perform the subtraction and detect only targets of interest. During the target detection operation, this reference background measurement is subtracted from the newly obtained radar frame. The subtraction can be a simple subtraction or some more advanced approach that reduces (e.g., tries to minimize) a mean squared error.

One way to obtain the reference background measurements is to perform a calibration at the beginning of the virtual touch operation (e.g., at the start time of the session). In this calibration, the user is asked to step away from the electronic device and measurements (e.g., radar measurements) are captured without the presence of the user near-by the radar. One or multiple frames could be captured, as the duration of one radar frame is usually very short (e.g., in the order of tens of milliseconds). If multiple radar frames are captured, then the multiple frames can be combined, for example by taking the average of the multiple frames to improve the quality of the reference background measurement.

In the case of Doppler processing methods, Doppler processing is used to reject unwanted static objects, rather than using a pre-measured reference background measurement(s). To improve the performance of the Doppler processing methods, the radar frame duration is carefully chosen such that the Doppler resolution (proportional to the frame duration) is sufficient (e.g., good enough) to filter out the unwanted static objects. In some implementations, a first-order Infinite Impulse Response (IIR) filter could be used. In other implementations, the zero-Doppler could be nulled out to eliminate a low speed target. For zero-Doppler nulling, the processor 120 can subtract the average of the radar measurements from each newly obtained radar measurement (for each antenna pair separately) rather than compute a full Fourier transform, which saves computational power. In yet another implementation, the processor 120 performs a discrete Fourier transform on radar measurements, and then those radar measurements corresponding to low Doppler indices (e.g., zero-Doppler and +k Doppler index, where k could be 1, 2, etc.) could be nulled out. The value selected for k may depend on the stability of the target of interest as well as the stability of the radar signal. Due to the temperature changes in a single radar frame, there might be some slight changes in the radar signal which could cause the radar measurement to appear like there is a non-zero Doppler present. After the background cancellation, remaining peaks (e.g., all remaining peaks) in the radar signal can be valid targets.

At block 1030, the processor 120 computes a range profile. At block 1040, to detect all these targets, the processor 120 determines a set of peaks (e.g., finds all peaks) in the range profile. The range profile could be computed as the average of the amplitude of the signals after the background cancellation (average across the measurements in the frame), and the advantage of this technique is that the processor 120 can perform one-dimensional (1D) target search in the resulting amplitude of the range profile, which has low computational complexity. The method 1000 proceeds from block 1040 to blocks 1050 and 1060 at the same time.

At block 1050, once peak detection is completed, for each detected peak in the range profile, the processor 120 computes a power angular spectrum (PAS). The PAS is used to estimate the angles (both the tangential and normal angles) associated with the detected peak. A technique to compute the PAS is to compute the covariance matrix at the detected peak, and then apply an angle estimation algorithm (such as the Bartlett beamforming, the Capon's beamforming, MUSIC, ESPRIT, etc.) on the covariance matrix to obtain a PAS. At block 1070, peak finding in the PAS is conducted to determine whether the range peak contains multiple targets that are separable in the angular domain.

The procedure of block 1060 can be performed at the same time as the procedures of blocks 1050 and 1070. At block 1060, the processor 120 computes the Doppler for each peak range to estimate the speed of the target(s) at the range. Multiple separable targets can be identified in the Doppler domain as well.

At block 1080, for each detected range peak among the set of range peaks detected, the processor 120 outputs the detected peak and its associated parameter. For example, all the detected targets and their associated parameters (range, tangential angle, normal angle, and Doppler) are output by the processor 120 to the next processing block, which can be block 930 of FIG. 9.

As an approximation, the total number of targets detected for a particular range peak can be approximated as the maximum between the number of targets detected in the angle or Doppler domain, as shown in Equation 10. Note that the approximation in Equation 10 is suitable for most situations for virtual touch interaction, as most situations usually detect at most 2 targets. For example, a zooming-out motion using two hands, where each hand is one target. Initially, the two hands are joined together (e.g., touching) at the same location or nearly touching each other at close-by locations. But the zooming motion of moving in opposite directions may cause the two hands to be separable in the Doppler domain. Slightly later, the two hands could become separated enough that they can also be separable in the angular domain. Note that in most practical situations, especially when the radar has high range resolution, it is unlikely that the two hands remain in the same range bins for the entire zooming-motion. As such even if the approximation shown in Equation 10 might be incorrect, the approximation would correct itself quickly as both (e.g., all) of the targets would become separable in one of the domains.

$$num \text{ targets at range peak} = \qquad (10)$$

$$max(num \text{ targets in angle domains}, num \text{ targets in Doppler domain})$$

In some embodiments, a more advanced approach with higher complexity is implemented in the electronic device 101, as such, joint target detection can be executed over a subset (over multiple dimensions together or overall) of the four dimensions: range, tangential angle, normal angle, and Doppler. In this higher complexity case, a clustering algorithm (e.g., DBScan) in addition to a CFAR detection could be used to directly detect multiple targets (e.g., all of the targets) jointly.

Figures 11, 12:
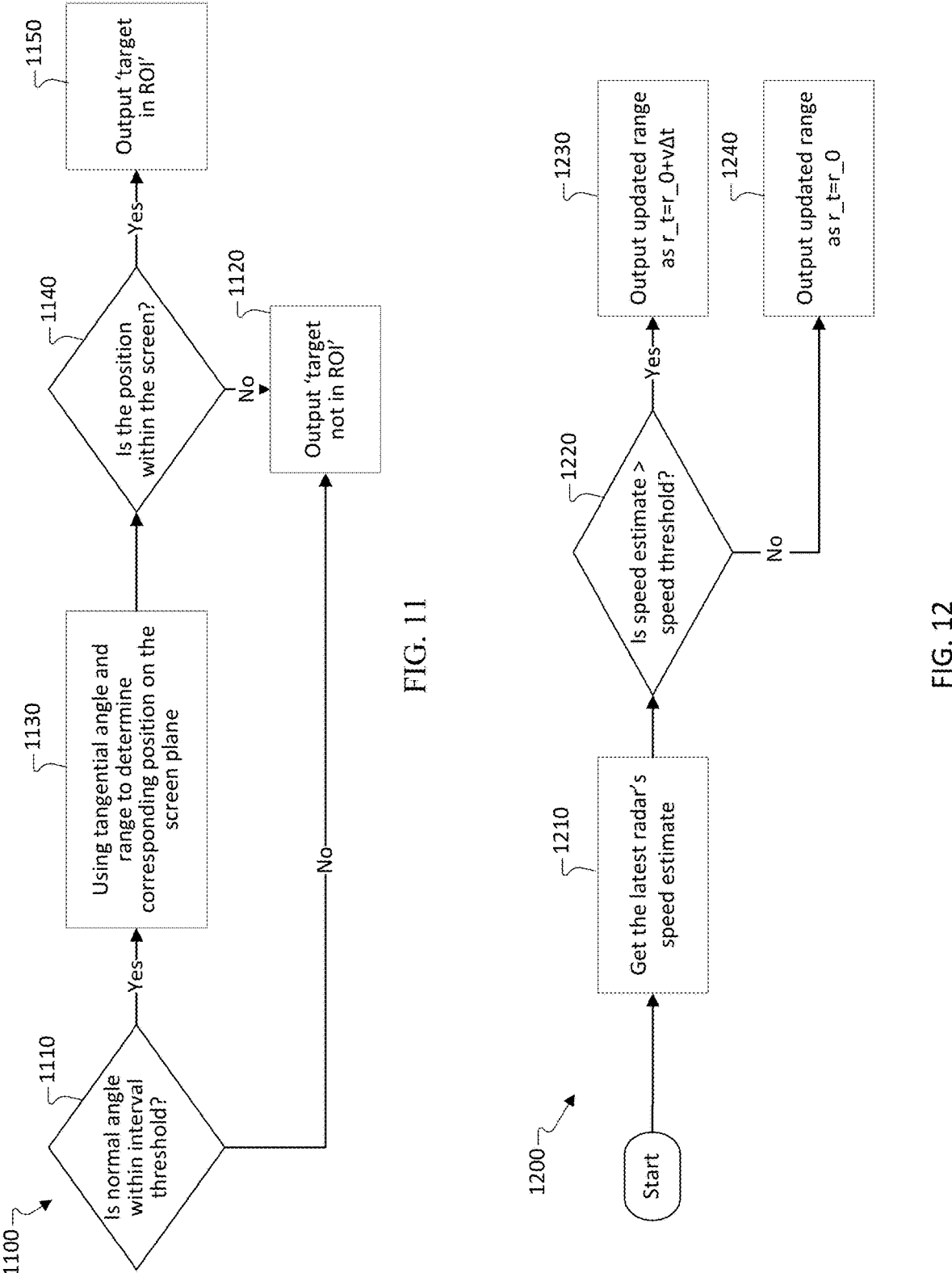
FIG. 11 illustrates a method to eliminate irrelevant objects among the set of objects detected, according to this disclosure.
FIG. 12 illustrates a method of extrapolation for smoother target location tracking, according to this disclosure.

FIG. 11 illustrates a method 1100 to eliminate irrelevant objects among the set of objects detected, according to this disclosure. The embodiment of the method shown in FIG. 11 is for illustration only, and other embodiments could be used without departing from the scope of this disclosure.

More particularly, the method 1100 in FIG. 11 enables the electronic device 101 to determine, for each respective object among a set of objects detected, whether the respective object is in a ROI based on the set of parameters associated with the respective object. The estimated set of parameters associated with the respective object includes a normal angle, a tangential angle, and a range. In the method 1100, irrelevant targets for the virtual touch detection are eliminated. In one implementation, objects detected outside of the ROI are eliminated. The method 1100 utilizes a ROI, such as the ROI 800 of FIG. 8, which is a 3D region that is a thin slice of space near the screen 700. The procedures of blocks 1110-1150 can be the procedures of block 930 of FIG. 9.

At block 1110, to determine if a detected object is not in the ROI, the processor 120 determines whether the normal angle corresponding to the detected object is within an interval threshold. If the normal angle is not within an angular interval threshold corresponding to the thin slice of the radar's FoV that is the ROI, then the processor 120 determines that the detected object is not within the ROI.

The interval threshold can be relatively loose (e.g., a wide range of normal angle values) as further filtering can be applied in the subsequent processing blocks (e.g., a next step) when connecting to the virtual touch event output (either Option 1 or Option 2). For example the normal angular interval threshold for defining the ROI can be defined to be [−5, 5] degrees relative to the reference axis 714 (shown in FIG. 7) that corresponds to the normal angle of 0 degrees ($\theta$N=0). If the normal angle of the detected object is 10 degrees, then the detected object is outside of that interval threshold, and thus the detected object is not within the ROI. If the normal angle of the detected object is 2 degrees, which is within the interval threshold, then the target is identified to be within the ROI. If the position of the detected object is outside the screen (e.g., outside the coordinates of the screen 700), the detected object is not within the ROI.

In response to a determination that the normal angle corresponding to the detected object is outside the angular interval threshold, at block 1120, the processor 120 outputs an indicator that the detected object is not in the ROI. If this condition (e.g., the detected object's normal angle is within the normal angular interval threshold) is satisfied, then at block 1130, the processor 120 determines the position of the target corresponding to the position on the screen based on additional parameters associated with the target including the range and tangential angle.

At block 1140, the processor 120 determines whether the position of the target is within the screen. More particularly, the position of the target is within the screen if the processor 120 determines that the position of the target translates to coordinates of the screen and that the resulting translated coordinates are within boundaries of the screen. In response to a determination that the position of the target does not translate to coordinates of the screen, the method 1100 proceeds to block 1120, at which the processor 120 outputs the indicator that the detected object is not in the ROI. At block 1150, the processor 120 outputs an indicator that the target is within the ROI, in response to a determination that the position of the target is within the screen.

The procedures of blocks 1110-1150 can be followed by the procedures of block 940 of FIG. 9. Before describing details of block 940 or how to process those targets in the ROI to detect virtual touch events, this disclosure describes multiple techniques to restrict the width 804 of the ROI to within a thin slice of space near the screen. These multiple techniques can be used in combination with each other.

One technique to restrict the width of the ROI includes using antenna designs such that the antenna pattern has a small beamwidth along the normal angle direction. The antenna design can impact the sidelobe of the antenna patterns as well. Ideally, the illuminated energy is within the main beam, and this main beam has a narrow beamwidth.

In the case of multiple antennas, depending on the number of antennas (more antennas being more desirable than fewer antennas), the technique for ROI width restriction includes to apply digital beamforming with progressively narrower beams for larger range such that the width 804 of the ROI at the larger range remains constant or similar to the width of the ROI at a short range. Additionally, tapering methods can be applied to suppress the sidelobe. In addition to suppression of signals outside the ROI, the technique for ROI width restriction includes to monitor whether the detected object is in the ROI using the estimated normal angle, as described in the method 1100 of FIG. 11.

At block 1150, the determination that the target is within the ROI can be equivalent to a "touched state." Oppositely, at block 1120, the determination that the target is not in the ROI can be equivalent to an "untouched state." For a good user experience, it is desirable to detect 'touched state' only when the user intended to do touch interaction. This disclosure provides techniques for robustifying a touched/untouched event transition. An example scenario where good robustness is needed is when there is a non-negligible error in the estimated normal angles, which can be used as described in the method 1100 to determine whether the target is within the ROI. With such a non-negligible error, when the user is hesitant in a performance of a touch operation, the user might pull the hand slightly away from the screen (e.g., in the normal direction 720) and visually check the screen to decide (or think about) what to do. In such a scenario, the non-negligible error could cause a back and forth oscillation between touched and un-touched state, which could degrade the user experience. This disclosure provides mechanisms to mitigate this issue, for example as described further below with FIG. 13.

FIG. 12 illustrates a method 1200 of extrapolation for smoother target location tracking, according to this disclosure. The embodiment of the method 1200 shown in FIG. 12 is for illustration only, and other embodiments could be used without departing from the scope of this disclosure. The procedures of blocks 1210-1240 can be used for virtual touch event processing for Option 1 radar detection output, and can be included as part of the procedures of block 940 of FIG. 9 for detecting virtual touch events.

Use of the method 1200 is especially advantageous when the radar update rate is low. That is, extrapolation of the touch location improves update rate when adopted radar parameters correspond to a low radar detection rate.

At the start of the method 1200, the output from a previous step (e.g., block 920 of FIG. 9) which includes all the targets and associated estimated parameters (range, tangential angle, normal angle, and Doppler) can be output directly to the OS, which can handles (e.g., process) this virtual touch information in a similar way as a conventional physical touch screen. According to embodiments of this disclosure, additional mechanisms are tailored or adapted to radar implementation to improve the performance and user experience of virtual touch interaction.

In one implementation, radar power consumption is a concern, and the radar processing is designed to provide the radar detection update at a relatively slower rate, such as once every few hundred of milliseconds. For example, if the concern is about radar power consumption being too high or draining the battery of a radar-equipped device (e.g., electronic device 101), then the radar pulse frequency can be reduced, which can cause a corresponding reduction of the frequency at which radar detection results are generated/updated. In that case, if detection results are output directly to the OS, the update rate on the screen (e.g., the location of the cursor in the virtual touch interface displayed on the screen) could look jumpy due to the relatively slower update rate of the underlying radar detection system.

To mitigate the effects of this issue, the method 1200 provides extrapolation using a recent estimate (e.g., the latest estimate) of the Doppler and angular changes. At block 1210, the processor 120 obtains speed estimate of a most recent processing unit for the radar. Particularly, the processing unit for the radar can be defined as a radar frame.

To avoid unnecessary jittering due to this extrapolation (which may occur when the target is relatively stationary), this extrapolation method 1200 could be executed when (e.g., only when) the detected speed of the target is greater than a speed threshold. At block 1220, the processor 120 determines whether the obtained speed estimate satisfies a speed condition, which is satisfied when the obtained speed estimate exceeds a speed threshold. If the speed condition is satisfied, the method 1200 proceeds to block 1230, at which the processor 120 outputs an updated range as $r_t=r_0+v\Delta t$. If the speed condition is not satisfied, the method proceeds to block 1240, at which the processor 120 outputs an updated range as $r_t==r_0$.

The latest update of the target detection result is denoted by $r_0$ and $\theta_0$, corresponding to the range and angle respectively, and this latest detection update occurred at time $t_0$. The current time is denoted as t and is before the next radar update. In a theoretical circumstance, the current time t is the ideal time at which to report of the target's location to the OS. However, in a real world circumstance, a lag time $\Delta t$ exists from the update time to of the latest detection to the current time t, as shown in Equation 11.

$$\Delta t = t - t_0 \tag{11}$$

The updated values to be reported to the OS can be computed according to Equation 12 and Equation 13, where v is the speed, and ω the angular velocity. The angle update could be implemented in the same manner using a different threshold, such as an angular threshold.

$$r_t = r_0 + v\Delta t \tag{12}$$

$$\theta_t = \theta_0 + \omega\Delta t \tag{13}$$

Figure 13:
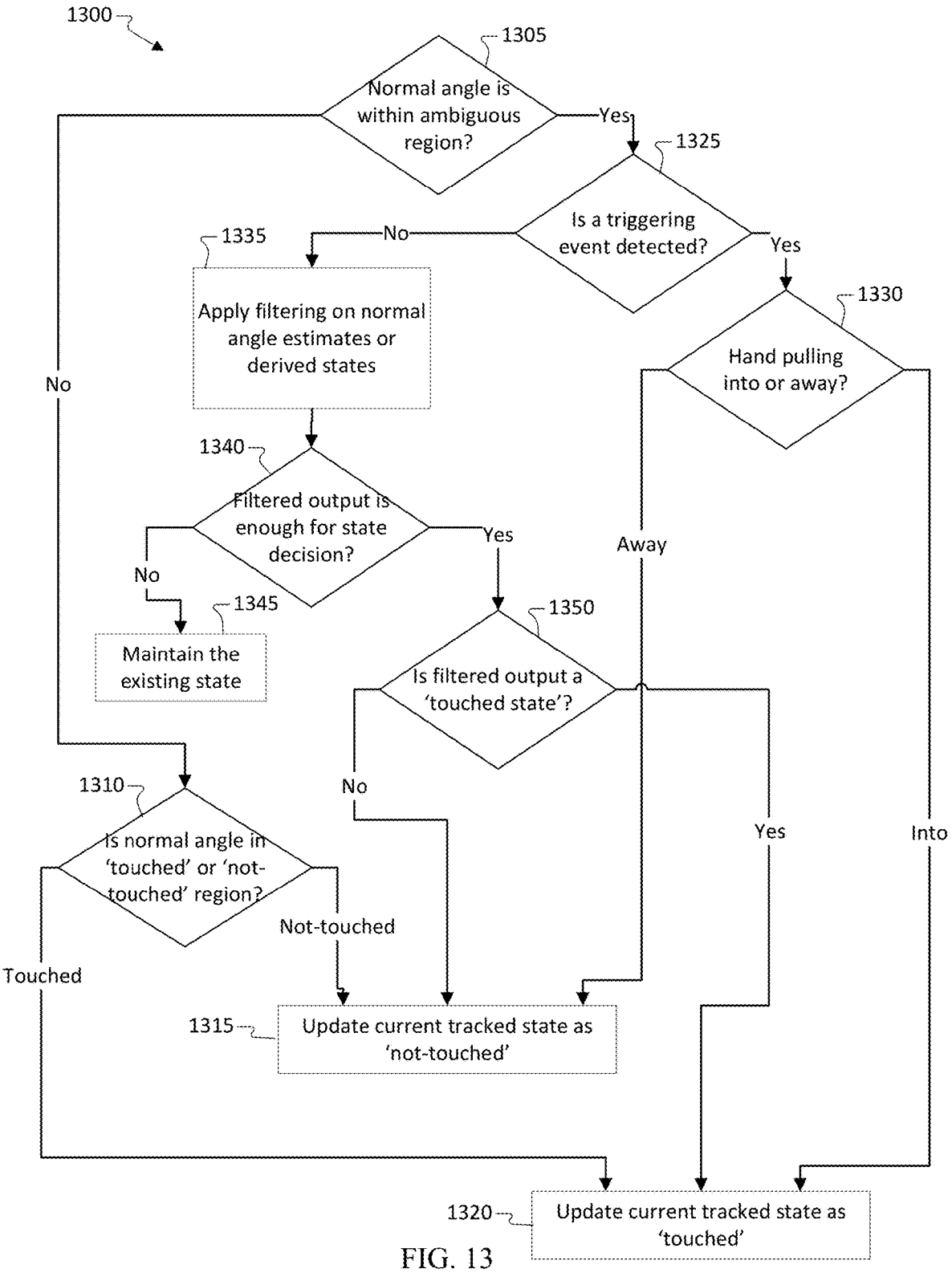
FIG. 13 illustrates a method for tracking a virtual touch state, according to this disclosure.

FIG. 13 illustrates a method 1300 for tracking a virtual touch state, according to this disclosure. The virtual touch state can switch between two states: the not-touched state and the touched state, as related to blocks 1120 and 1150 of FIG. 11. The embodiment of the method 1300 shown in FIG. 13 is for illustration only, and other embodiments could be used without departing from the scope of this disclosure.

In the method 1300, the processor 120 uses state tracking with triggering events for the touched/un-touched event transition. State tracking is one technique used in method 1300 to mitigate oscillation between virtual touch states due to error in the estimated normal angle. Additionally, both the filtering of the estimated normal angle and triggering events are used.

The method 1300 can begin at block 1305, at which the estimated normal angle is checked to determine if it falls into an ambiguous region where the angle estimation error could cause the state to be touched or not-touched. For example, if the 90th percentile absolute error of the angle estimate is 1 degree, then the ambiguous region can be defined as [th_boundary-1, th_boundary+1], where th_boundary denotes the normal angle corresponding to the boundary of the ROI. Depending on the definition of the ROI, this boundary of the ROI can be range-dependent if the desired ROI is to have a substantially constant width (e.g., width 804 of FIG. 8) throughout the whole coverage of the screen 700.

If the estimated normal angle does not fall into the ambiguous region, then at block 1310, the processor 120 selects the state to be 'not-touched' or 'touched' and the tracked state is updated at blocks 1315 or 1320, accordingly. More particularly, in response to a determination that the normal angle is in a 'not-touched' region, the processor 120 selects the not-touched state and updates (at block 1315) the current tracked state as 'not-touched'. Alternatively, in response to a determination that the normal angle is in a 'touched' region, the processor 120 selects the touch state and updates (at block 1320) the current tracked state as 'touched'.

At block 1325, when the estimated normal angle is within the ambiguous region, the processor 120 checks for triggering events by determining whether a triggering event is detected. Examples of triggering events include the hand moving into or pulling away from the screen. At block 1330, the processor 120 determines whether the direction of the movement of the hand is into or away from the ROI. Such triggering events can be detected using the Doppler, or using Doppler and angle variations. For example, when the hand of the user approaches the screen to perform a virtual touch, the approaching hand causes a specific Doppler pattern corresponding to the velocity profile of motion towards the radar along the normal angle. In the case of the hand pulling away but still stopping within the ambiguous region, the signature of the smaller motion of hand pulling away may or may not be reliably detectable depending on various factors such as the error level of the angle estimation (i.e., the size of the ambiguous region) and the range of the target. For a larger range, even with the same angle difference, the length of the arc will be longer and could have a higher probability of being detected using the Doppler due to a larger change in the displacement. If a triggering event is detected, then at block 1330, determination that the hand motion is away from or into the ROI causes the processor 120 to update the tracked state to the not-touched state at block 1315 or the touched state at block 1320, respectively.

At block 1335, to account for cases in which the triggering event might not be detected, the processor 120 applies a complementary filter to the estimated normal angle or to derived states which are noisy. In the case of complementary filtering of the estimated normal angle, the processor 120 applies a low pass filter to the estimated normal angle to reduce the noise. For example, the processor 120 can compute an average representing a moving average or can compute an average within a specified window duration (e.g., average over the last 10 radar updates). In the case of complementary filtering of derived states that are noisy, a 'noisy state' is tentative state determined by treating the estimated normal angle against the ROI boundary threshold without considering the associated angle estimation error. For this quantized situation of using the noisy state, the processor 120 applies a counting threshold on the tentative state. If the tentative state is the 'touched' state for a majority of times within a specified time window (e.g., 7 out of the last 10 radar updates), then 'touched' event can be updated at block 1320.

In both cases, the complementary filtering is implemented within the specified time window length. At block 1340, the processor 120 determines whether the window length has reached the specified length required for a state determination to be made (i.e., to end the tentative, noisy state). For the case of the filtering on the tentative state, if the majority condition is not met even with a full window length, the processor 120 determines that the state is not yet determinable. For example, after the filtering of each radar frame, the processor 120 can determine whether the filtering output is enough for making a determination of the state.

If the filtering output is not enough (i.e., less than the specified window length or less than the counting threshold), then the previous state (either touched or untouched) is kept. At block 1345, the processor 120 determines that the state is not yet determinable when the window of filtered output is less than the specified time window length. That is, at block 1345, the processor 120 maintains the existing state and does not yet update the current tracked state. At block 1350, if the window of filtered output is enough to make a state determination, then the current tracked state is updated accordingly. Particularly, if within the specified time window, the computed average of the filtered estimated normal angles corresponds to the 'not-touched' state, then 'not-touched' event can be updated at block 1315.

An additional radar can be used to reduce the error amplification due to the large range. Another approach to mitigate the ambiguous region issue is to utilize this additional hardware, as opposed to the soft approach in method 1300 of FIG. 13, as solution to mitigate the normal angle estimation error problem associated with the ambiguous region. If the cost is affordable, using multiple radars can help mitigate the uncertainty region. The ambiguous region originates from the normal angle estimation error. When accounting for the distance from the screen along the normal direction of the screen, the ambiguous region would increase as the range increases. One way to reduce this ambiguous distance from the screen is to reduce the effective range for a given radar. An example in FIG. 8 shows that a radar 710 is installed at the bottom of the screen 700, and in this case, the ambiguous region in the ROI 800 is largest at the top of the screen 700. If an additional radar (i.e., second radar) is installed at the top, then the second radar can be used in combination with the bottom radar 710 to reduce the effective range coverage of the radar by half. When multiple radars are utilized, coordination between the two radars is needed, such as proper handling of the boundary and ensuring that there is no harmful interference between the two. The handling of the boundary between multiple radars will be described further below with embodiments (FIG. 20) that use multiple radars to improve the ROI coverage of the screen. For the interference management, in many cases the radar transmission timing is very sparse (e.g., with a duty cycle of 1% or less) and thus inherently the probability of the interference is not likely. However, some synchronization mechanism could be implemented to ensure that the two radars would use the transmission timing that does not overlap.

While the virtual touch does not provide a touch sensation feedback to the user, a visual cue shown on the screen (e.g., changing the cursor shape to indicate the touched state) provides visual feedback to the user who could still get a sense of whether the user's intended operation is successful or not. For example, the user intent can be to touch a specific icon, but the user is not really sure where the ROI (or boundary of the ROI) is located. In this case, the user can move the hand to approach the screen, and at one point the cursor changes (e.g., becomes visible) indicating to the user that the hand crossed a boundary of the ROI (i.e., touch sensing region). This kind of visual cue will help the user to quick and intuitively recognize the ROI (including invisible boundaries of the ROI) for virtual touch interactions. Sound may also be used either as an alternative sensory feedback or in combination with the visual cue.

Further regarding Option 2, the detected targets within the ROI from a previous processing block (e.g., 930 of FIG. 9) are represented as cursors without any associated action. Particularly, a situation in which the user is hovering or moving the hand around in the ROI is analogous to a computer mouse cursor displayed and moving around a screen. In this case, the detected target's position (i.e., position coordinates of the hand within the ROI as projected on the plane of the screen or as translated to the coordinates of the screen) can be used to display a cursor hovering or moving around in the screen following the hand position.

This action of moving the cursor around would generally not trigger any click events, except some contextual information of an icon can be output (e.g., displayed) if the cursor is hovering over the icon, but such hovering will not open the link associated with the icon until a click event occurs. That is, in this Option 2, hovering is not a click event. Radar, especially at high frequencies such as mmWave or THz, is very sensitive to Doppler, and embodiments of this disclosure base the click event design on Doppler features exploiting this heightened radar sensitivity to Doppler. Some example choices for the click event include the tapping motion FIG. 6A or the grabbing motion of FIG. 6B. Other choices of motion for the click event could also be used.

In this case, the click event is designed as the tapping motion of FIG. 6A, including the up-tapping gesture 610 followed by the down-tapping gesture 620. That is, the palm of the hand starts in a relaxed state or open state moving up and back down. This design of the click event would cause Doppler patterns corresponding to the motion of moving up and then moving down, and a signal processing approach could be implemented to detection this event.

In some embodiments, the click event can be designed as a pull-push gesture such that the palm of the hand starts in the second position 615 (shown in FIG. 6A) with palm being nearly in a parallel orientation with respect to the plane of the screen, then the palm moves backward away from the screen in the normal direction (720 of FIG. 7) and then forward toward the screen. This design of the click event would cause Doppler patterns corresponding to the motion of moving backward and then moving toward the screen, and a signal processing approach could be implemented to detect this event.

In some embodiments, the click event is designed as grabbing gesture 640 such that the user performs the motion of closing an open palm into a fist. This grabbing gesture 640 can be assigned as more intuitive for a drag-and-drop operation. The user moves the hand to the position for the item to be dragged, then performs the grabbing gesture 640 (open palm to fist), moves the hand to the drop location, and finally performs a release motion (first position 645 back to open palm position 615).

Figure 14:
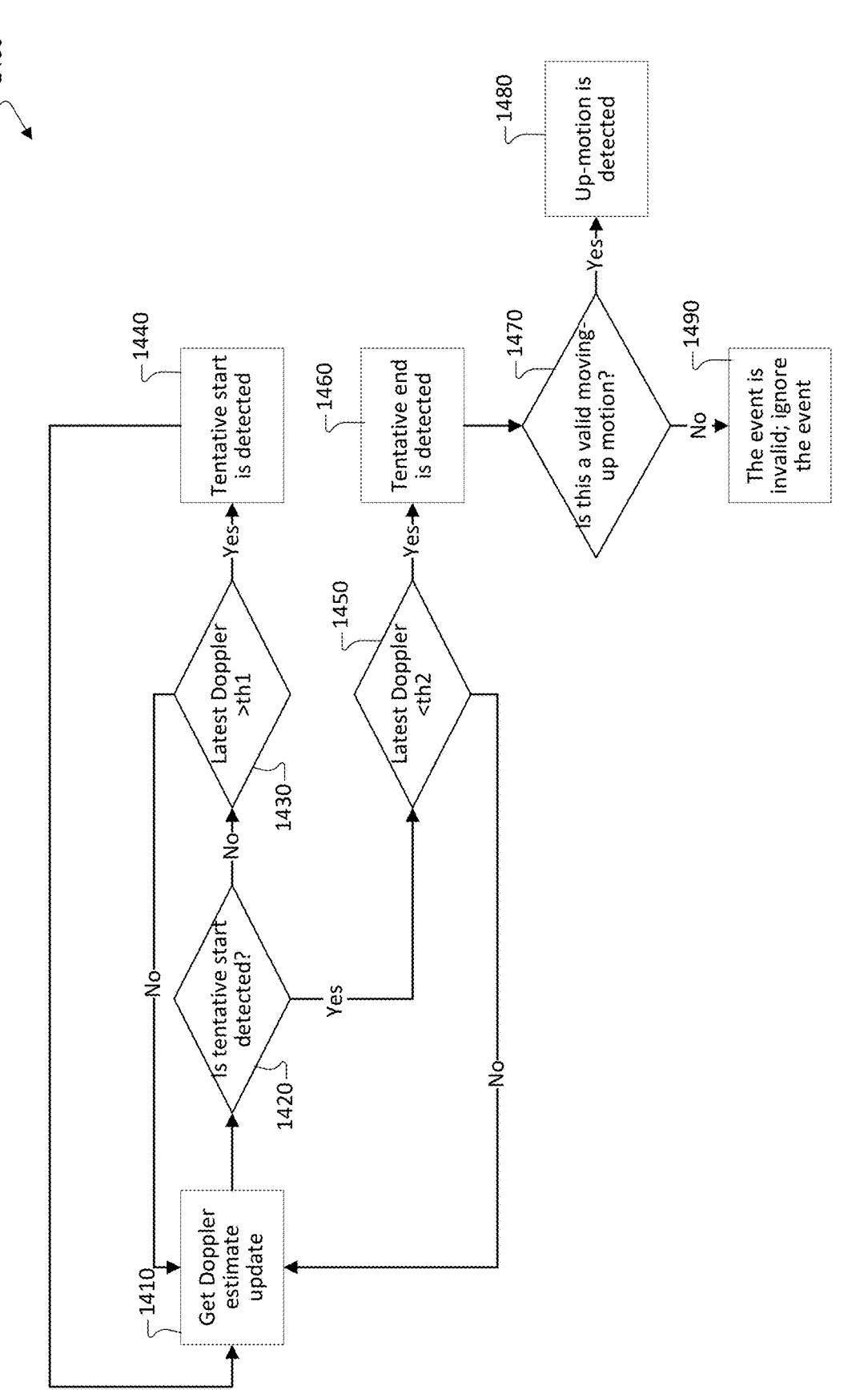
FIG. 14 illustrates a method for detecting an up-tapping gesture included in a virtual click interaction, according to this disclosure.

FIG. 14 illustrates a method 1400 for detecting an up-tapping gesture included in a virtual click interaction, according to this disclosure. The embodiment of the method 1400 shown in FIG. 14 is for illustration only, and other embodiments could be used without departing from the scope of this disclosure.

The procedures of blocks 1410-1490 can be used for virtual touch event processing for Option 2 radar detection output, and can be included as part of the procedures of block 940 of FIG. 9 for detecting virtual touch events.

For ease of description, the method 1400 will be described for the case in which the tapping motion (specifically, up/down tapping 610 followed by 620) is assigned as the click event. Particularly, a radar signal processing technique for detecting such a taping motion click event will be described. If a different motion pattern has differences (e.g., significant differences) from the tapping motion, then a different, yet detection algorithm could be designed tailored to the different motion pattern. For the same type of tapping motion with different orientation, the methods described here could be modified by adjusting the thresholds.

The description of the method 1400 is based on an assumption that radar is at the bottom of the screen, meaning that the target moves away from the radar during the up-tapping gesture 610 (which results in a positive Doppler), and the target moves toward the radar during the second half of tapping (i.e., down-tapping gesture 620), which causes negative Doppler. This Doppler change pattern is used to detect this click event (i.e., detect tapping motion). Considering this simple pattern, the method 1400 is executed by a virtual click detection mechanism based on Doppler estimate.

At block 1410, the estimated Doppler may be filtered, for example using a low pass filter to reduce noise effect. The estimated Doppler can be computed as a weighted mean of the Doppler frequency and the power associated with the Doppler bin. Other approaches such as using the Doppler frequency corresponding to the maximum energy may also be used.

At block 1420, once a new Doppler estimate update is computed, the processor 120 determines whether a tentative start of the up-tapping gesture (i.e., first half) of the tapping motion is detected or not. If it is not, at block 1430, the processor 120 determines whether the tentative start condition is satisfied, which in this case is a simple comparison of the Doppler estimate update (i.e., latest Doppler) against a first threshold th1. If the Doppler estimate is greater than th1, then at block 1440, the processor 120 detects a tentative start, sets a flag to TRUE to indicate that a tentative start has been detected, and the method 1400 returns block 1410 to wait to obtain the next Doppler estimate update.

Alternatively, if a tentative start has been detected, then at block 1450, the processor 120 executes a detection algorithm to monitor for or detect an end point of the already-started motion. Particularly, the processor 120 compares the latest Doppler estimate to a second threshold th2 (which maybe the same as or different from the first threshold th1). At block 1460, if the latest Doppler estimate is greater than the second threshold th2, then the tentative end point is not yet detected, and the method 1400 returns to block 1410 to wait for the next Doppler update. If the latest Doppler estimate is less than the second threshold th2, the processor 120 detects a tentative end.

At block 1470, the processor 120 determines whether the signal between the tentative start and tentative end satisfies criteria (i.e., one or more conditions) for a valid up-tapping gesture for the tapping or not. At block 1480, the processor 120 detects an up-tapping gesture 610 in response to a determination that the radar signal (including the associated Doppler) corresponding to the user's hand motion satisfies the criteria for the valid up-tapping gesture. On the other hand, if the user's hand motion fails to satisfy the criteria for the valid up-tapping gesture, then at block 1490, the processor 120 ignores the event associated with the tentative start and determines that the event is invalid.

At block 1470, the criteria relate to expected properties of the signal for the valid up-tapping gesture motion (first half of tapping) can be used to define this condition be checked in this stage. One example criterion is that the tentative start and tentative end positions of the tapping are within a distance threshold. This condition can be derived from the fact that for a valid tapping (corresponding to a click event) it is expected that the hand remains at roughly the same location. For example, this criterion would reject a motion of moving the hand from the current position (e.g., at a bottom or central part of the screen) to a location at the upper part of the screen.

Another example criterion includes the length of the motion within a specified acceptable duration. A typical duration of the motion is expected for a typical user-performance of a valid tapping motion, and so any length of motion that is too long or too short would be considered as invalid. One way to determine a range of thresholds to define durations that are too short and too long is to perform user data collection over time and derive the thresholds from the user's data collected, such as selecting the acceptable duration as the 90th percentile of the user's data collected.

Another example criterion includes a large displacement of the target within the duration of the motion. For a valid tapping motion, the position of the hand remains at roughly the same position for the whole duration of the motion. If the processor 120 detects a large displacement of the target during the motion duration, the user's motion can be determined as an invalid motion (i.e., invalid tapping motion or invalid virtual click). An example of a false alarm (e.g., invalid event) occurs when the user's hand moves to an upper part of the screen and quickly moves back to the original position at a different part of the screen away from the upper part. This motion corresponding to the false alarm can cause a change of the position of the cursor (from original position to upper part and return to the original position) but does not cause the processor 120 to detect a click event at the original position.

Although FIG. 14 shows one embodiment a method 1400 for detecting an up-tapping gesture included in a virtual click interaction, a similar procedure as FIG. 14 can be used to detect the down-tapping gesture 620 (second half) part of the tapping motion as well. The difference (e.g., only difference is some cases) is that the Doppler is negative because for the down-tapping gesture 620, the target approaches toward the radar. The same set of validation criteria described above for the up-tapping gesture motion could also be used here.

For a more complex motion, such as the grabbing gesture 640, a pattern matching method can be used, for example, a machine learning solution for pattern matching could be used. In this case of the grabbing gesture 640 assigned to the virtual click event, the processor 120 extracts some features from the Doppler processing such as a time velocity diagram (TVD) as the input feature to be input to the machine learning solution. Various types of machine learning algorithms could be used, such as neural networks (such as convolutional neural networks), recurrent neural networks, long-short-term-memory networks, transformer architecture, and the like.

The extracted features, such as the TVD that is typically a two-dimensional feature, can be vectorized into a single dimensional (1D) feature or could be summarized into 1D by extracting information of interest (e.g., important information). Some examples of such extracted information of interest includes the weighted Doppler, the Doppler spread, the maximum Doppler, and the like for each time step. The time step can be the radar frame duration. For such 1D features, various neural networks described in this disclosure can be used with appropriate choices of the input feature dimension. Further, classical machine learning algorithms like the multi-layer perceptron, the support vector machine (SVM), the random forest, etc. may be applied.

To train such a machine learning system, data for the earlier defined patterns are collected to generate training data. For robustness, the training data should be collected from multiple users and different environments, which may also include different screen types. For example, assume the grabbing gesture 640 is the trigger motion assigned to the virtual click event. To collect training samples, users are asked to perform grabbing motion (per the definition of the grabbing gesture) repeatedly at various locations within the ROI. Then the signal (e.g., TVD) corresponding to the grabbing motion duration can be extracted as the training sample. The machine learning system or a rule-based technique for pattern recognition can be executed to determine the start and end of a grabbing motion. In another implementation, the radar signal features corresponding to a sliding window of a specified duration (e.g., acceptable duration specified by the 90th percentile) may be used as input to the machine learning system or rule-based technique. In this case, to reduce computation, the pattern recognition system may start to process the sliding windows only when there is a target within the ROI. Further, the processor 120 can also apply a constraint such that that the pattern recognition system starts the processing of the sliding windows only when there is a target within the ROI and the target starts a motion (e.g., by thresholding on the Doppler).

Figure 15:
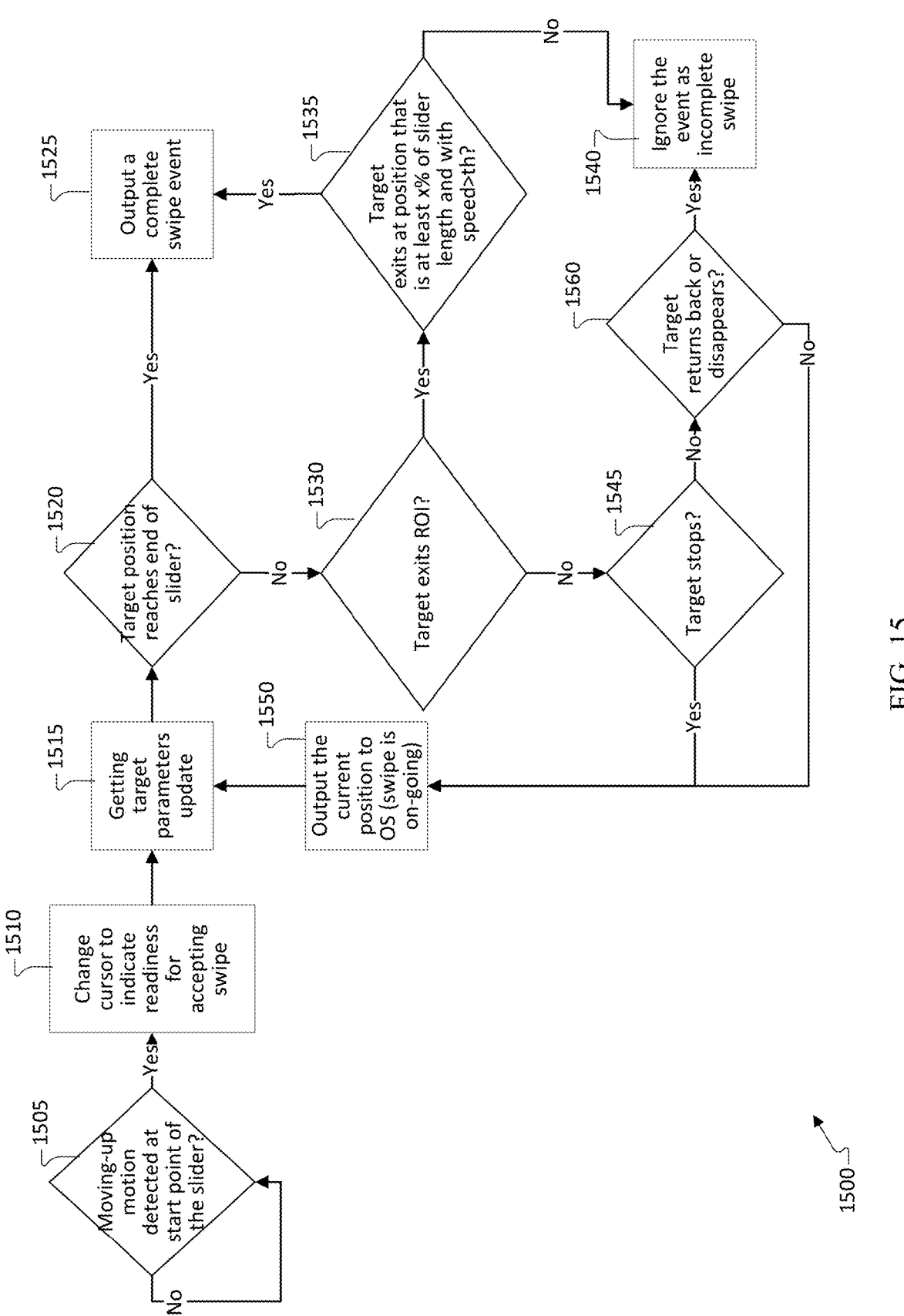
FIG. 15 illustrates a method for detecting a swipe virtual interaction, according to this disclosure.

FIG. 15 illustrates a method 1500 for detecting a swipe virtual interaction, according to this disclosure. The embodiment of the method shown in FIG. 15 is for illustration only, and other embodiments could be used without departing from the scope of this disclosure.

In addition to the virtual click event (i.e., tapping of FIG. 6A detected according to the method of FIG. 14) being an example trigger event, this disclosure provides other trigger motions for other control events. Other control events include: swipe, scroll, drag-and-drop, and a zoom operation (either in or out). Swipe and scroll are the same type of motion except for their context. The method 1500 relates to events for operating this virtual touch interaction beyond the click event detection of FIG. 14. Note that the Option 2 applied at the beginning the detected target position in the ROI is only used for determining a cursor position, and is not considered a touched state in the analogy to a physical touch screen. To describe the method 1500, a scenario includes the user first performing the up-tapping gesture 610 and then a swipe/scroll along a desired direction. The blocks 1505-1560 of FIG. 15 include the procedures for supporting this swipe/scroll operation.

At block 1505, the processor 120 determines whether the up-tapping gesture 610 is detected at a start point of a slider. Particularly, the processor 120 determines whether the motion of the user's hand corresponds to the up-tapping gesture 610, and determines whether the position of the user's hand corresponds to the start point of the slider.

From the GUI perspective, to indicate to the user the readiness for accepting the swipe/scroll, at block 1510, the cursor is changed after the up-tapping gesture 610 is detected. For example, in the normal state (e.g., prior to detection of the up-tapping gesture or virtual click event) the display device can display the cursor as an open palm, and after the up-tapping gesture 610 is detected, the cursor can be changed into a closed first to indicate the readiness for the swipe/scroll.

At block 1515, the processor 120 obtains target parameters updates, such as updates every radar frame. For a swipe gesture, once started, the processor 120 tracks the current position of the target and reports to the OS (or reports to an appropriate entity) that visually renders the current swipe state in the GUI (e.g., displaying a slider moving).

At block 1520, the processor 120 determines whether the target position reaches an end of the slider. To detect the end of the swipe operation, there are cases in which a slider (i.e., slide visual indicator) is shown on the screen, as such, the end of the swipe could be detected when the hand position reaches the end point in the slider shown in the GUI. At block 1525, the processor 120 outputs an indicator of a complete swipe event.

In a different situation, the hand might move out of the ROI in the middle of the swipe or in the middle of the slider. At block 1530, the processor 120 determines whether the target exits the ROI. For this ROI-exit situation, the processor 120 can be configured to recognize the exit out of the ROI as a complete swipe.

At block 1535, the ROI-exit condition can be combined with a speed condition (i.e., exiting speed exceeds a speed threshold) that requires the speed of the hand moving out of the ROI detected within a threshold speed range that indicates the intent of the user to perform the swipe. An additional locational condition can be that the exit point is at a position mapped to completion of at least x % of the length of the slider, and the x % could be set to 70% as an example. This locational condition could help avoid some false alarm.

At block 1540, the processor 120 ignores the user's hand motion event as an incomplete swipe, in response to a determination that the locational condition is not satisfied or that the speed condition is not satisfied. An incomplete swipe occurs when the user stops the motion in the middle of the slider, and in that case the target should remain within the ROI and the velocity should be close to 0. For such a condition, at block 1545, the processor 120 determines whether the target stops within the ROI. If the target remains within the ROI and stops the motion, then at block 1550, the processor outputs the current position of the target to the OS and the swipe operation remains on-going (as illustrated by the method returning to block 1515 from block 1550). That is, if the user holds the hand at the stopping position, it could be a situation that the user is undecided whether to complete this swipe or not. So, the processor 120 can enter an undecided state, and this method 1500 waits for next radar update.

If the target remains within the ROI and does not stop the motion, at block 1560, the processor 120 determines whether the target returns back (e.g., swipes in an opposite or reverse direction) or disappears. If the target returns back to the original starting point of the slider, then the processor

120 determines such return back as an incomplete swipe and this event is ignored (at block 1540). Another situation is when the target disappears or becomes undetectable at the stopping point. This case could also be considered as an incomplete swipe and the event is ignored.

After a complete swipe is detected or it is determined to be incomplete and ignored, the display device can change the cursor back to a normal state of the cursor (e.g., closed first is changed back to open palm). In some embodiments, a swipe operation is not associated with a slider shown in the GUI, such as swiping a page when viewing a document. In that case, a swipe-allowable region may be defined (e.g., within the page) and instead of determining the end of the swipe relative to the slider's length of the swipe, the processor 120 can be configured to use the absolute length of the swipe instead.

Figures 16, 17:
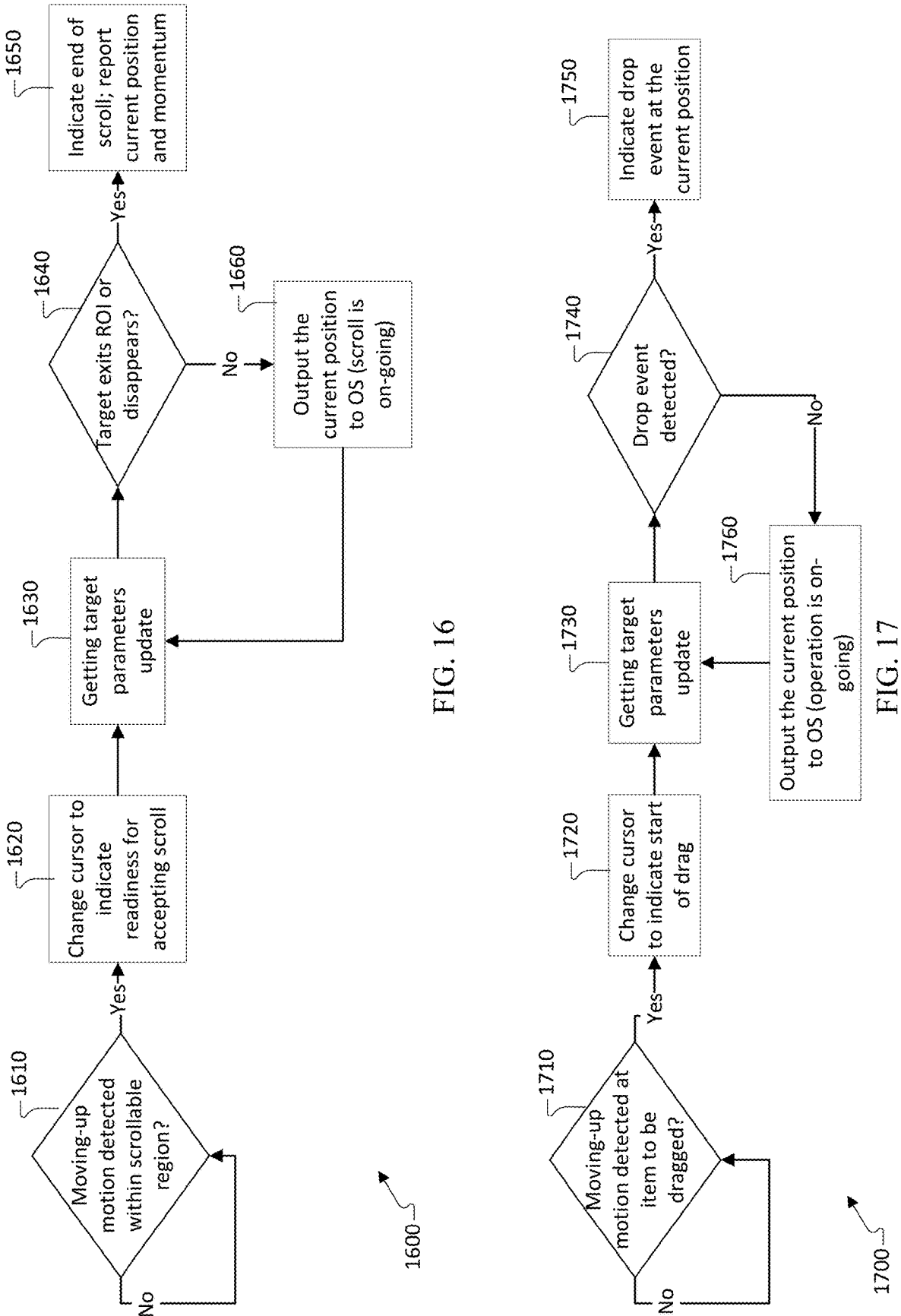
FIG. 16 illustrates a method for detecting a scroll virtual interaction, according to this disclosure.
FIG. 17 illustrates a method for detecting a drag-and-drop virtual interaction, according to this disclosure.

FIG. 16 illustrates a method 1600 for detecting a scroll virtual interaction, according to this disclosure. The embodiment of the method 1600 shown in FIG. 16 is for illustration only, and other embodiments could be used without departing from the scope of this disclosure.

The scroll operation is similar to swipe operation with some differences. As one difference, a scroll-enabled GUI may not include an indicator of a swipe operation that is in-progress, such as the slider described with block 1535 of FIG. 15. The scroll-enabled GUI includes one or more scrollable regions in the GUI where scroll initiation is accepted. As an example scrollable region, when viewing a document, the scroll operation may be allowed on any point on the page of the document, but not outside the page. Another difference is that there is no incomplete scroll unlike the swipe operation, which may be complete or incomplete. For a scroll operation, once started, the processor 120 tracks the current position of the target and reports to the OS or other entities that are responsible for reflecting (e.g., incorporating) the current scroll state in the GUI. If the end of the scroll is determined, then the end of scroll is indicated and the momentum at the release point is reported to the OS or appropriate entity. To determine the momentum, the processor 120 uses the velocity around the position of the target at the time the target (i.e., the hand) exits the ROI as the momentum of the scroll. If the target disappears (i.e., cannot be detected), the momentum could be set to 0. Such a momentum parameter can be used to allow the page scrolling operation to continue moving along the direction of the scroll.

At block 1610, the processor 120 determines whether the up-tapping gesture is detected within a scrollable region. The method 1600 repeats the procedure of block 1610 in response to a determination that an up-tapping gesture is not detected within a scrollable region. At block 1620, in response to an up-tapping gesture detected within a scrollable region, the processor 120 changes the cursor to indicate readiness for accepting a scroll operation.

At block 1630, the processor 120 obtains target parameters updates, such as updates every radar frame. The procedure at 1630 is similar to the procedure at block 920 of FIG. 9 or block 1515 of FIG. 15. At block 1640, the processor 120 determines whether the target exits the ROI or disappears. At block 1650, the processor indicates an end of the scroll operation based on a determination that the target disappeared or exited the ROI.

At block 1660, in response to a determination that the target did not disappear and remains within the ROI, the processor 120 outputs the current position of the target to the OS, and the scroll operation remains on-going (as illustrated by the method returning to block 1630 from block 1660. The procedure at block 1660 is similar to the procedure at block 1550 of FIG. 15.

FIG. 17 illustrates a method for detecting a drag-and-drop virtual interaction, according to this disclosure. The embodiment of the method shown in FIG. 17 is for illustration only, and other embodiments could be used without departing from the scope of this disclosure.

The starting position for a drag operation is the position of the item (e.g., an icon) to be dragged. For the release or drop operation, there are several implementation choices. In one implementation, the dropping operation is determined as the target moving out of the ROI at the position within the drop region. In another implementation, the dropping operation is determined based on an explicit release action, such as a subsequent click event. One or both of these implementation choices may be utilized by the virtual touch app 149. For the case of explicit release action, a pair of trigger motions could be used, such as the grabbing gesture 640 could be used at the start of a drag, and the reverse motion (first to open/relaxed palm) could be an explicit release action used for the drop. As another pair of trigger motions, the up-tapping gesture 610 can start a drag operation, and the down-tapping motion can be an explicit release action used for the drop operation.

For drag and drop operation, the procedures at blocks 1710, 1730, and 1760 can be the same as the procedure of corresponding blocks 1610, 1630, and 1660 of FIG. 16. That is, the starting of the drag can be the same as starting of swipe or scroll by using the up-tapping gesture 610.

At block 1720, the processor 120 changes the cursor to indicate a start of a drag operation. For example, an icon or item to be dragged can be displayed as lifted within the GUI above the original location of the icon. At block 1740, the processor 120 determines whether a drop event is detected based on an explicit release action, such as the user's hand motion corresponds the second half of a pair of triggering motions. At block 1750, the processor 120 indicates the drop event at the current position of the target, where the user performed the explicit release action.

Figures 18, 19:
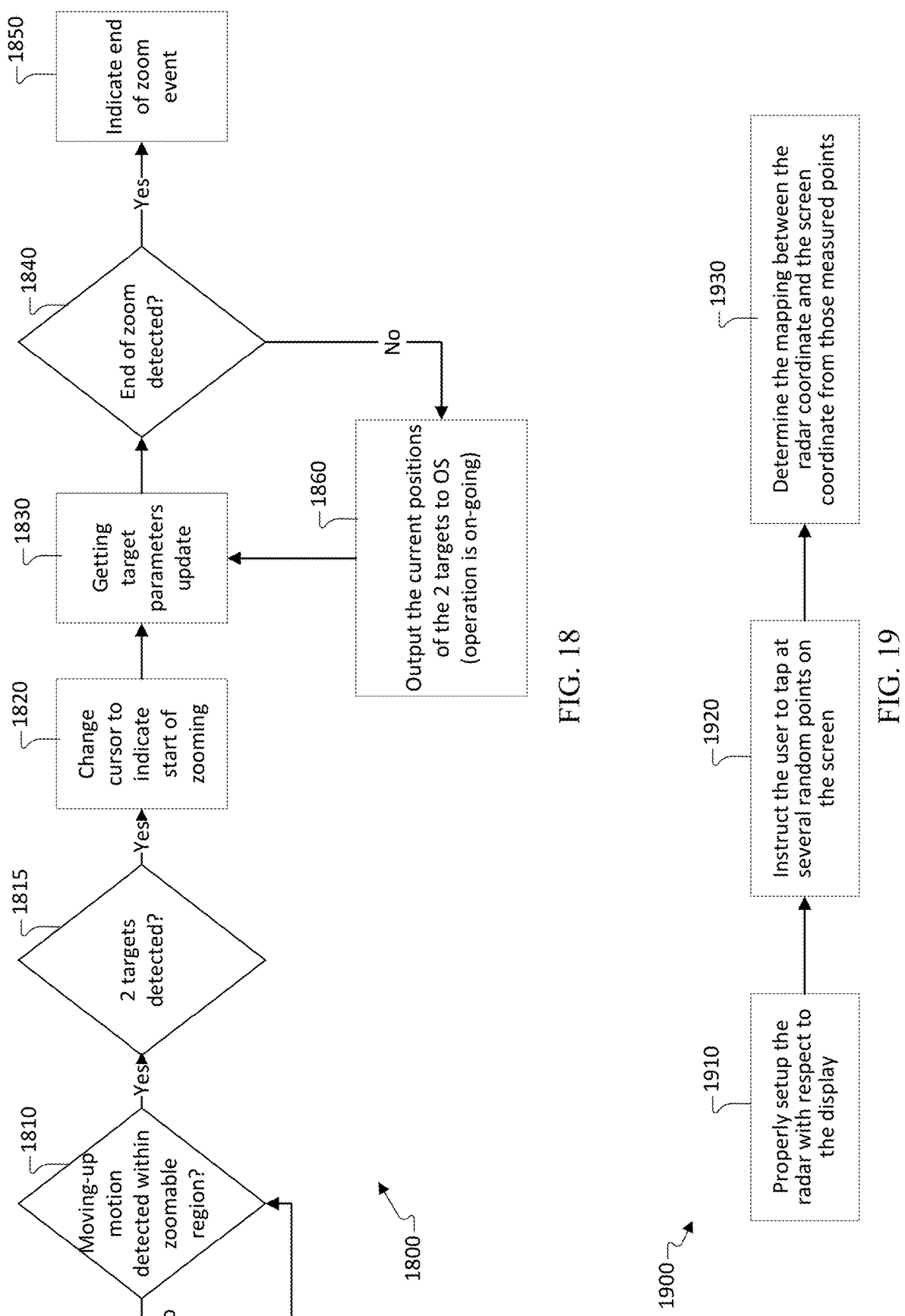
FIG. 18 illustrates a method for detecting a zoom virtual interaction, according to this disclosure.
FIG. 19 illustrates a calibration method for aligning a display coordinate with a radar coordinate, according to this disclosure.

FIG. 18 illustrates a method for detecting a zoom virtual interaction, according to this disclosure. The embodiment of the method shown in FIG. 18 is for illustration only, and other embodiments could be used without departing from the scope of this disclosure.

The zooming operation similarly starts with a virtual click event, such as the up-tapping gesture 610. The zooming operation utilizes two targets, which is different from the single target utilized in the other operations for click, swipe, scroll, and drag-and-drop. After detection of an occurrence of a virtual click event (e.g., up-tapping gesture 610) within a zoom-enabled region of the GUI, at least two targets need to be detected to determine a start of a zooming operation. Otherwise, the processor 120 could misidentify which control operation the user intends to perform and could enter readiness for another operation (swipe, scroll, or drag and drop). Once the start of zooming operation is detected, then the positions of the two targets are reported in each update until the end of zooming operation is detected. There are several choices for detecting the end of the zooming operation. In one implementation, the end of zooming is when the positions of the two targets stop changing. In another implementation, the end of zooming is explicitly indicated by another tapping event. In yet another implementation, the end of zooming is when one or both of the targets exit the ROI.

For a zoom operation, the procedures at blocks 1810, 1820, 1830, 1840, 1850, and 1860 can be the similar to the procedures of corresponding blocks 1610, 1620, 1630, 1640, 1650, and 1660 of FIG. 16. That is, the starting of the zoom operation can be the same as starting of swipe or scroll by using the up-tapping gesture 610. One difference is that at block 1860, the processor 120 outputs the current positions of two targets to the OS, which indicates that the zoom operation is on-going. Some other differences are described below.

At block 1815, the processor 120 determines whether two targets are detected within the ROI. In some embodiments, the processor 120 determines whether the zoomable region of the GUI includes at least two targets. The processor 120 may not start a zoom operation in response to a determination that at least two target are not detected.

At block 1820, the processor 120 changes the cursor to indicate a start of a zoom operation, based on a determination that at least two targets are detected concurrently within the ROI or zoomable region of the GUI. In some embodiments, a change of the zoomable region of the GUI can be used to indicate the start of the zoom operation. At block 1840, the processor 120 determines whether an end of zoom event is detected for an end of zoom operation, such as when both of the targets stop moving for a specified period of time, the user's hand exits the ROI, or the targets exit the zoomable region of the GUI. At block 1850, the processor 120 indicates the end of zoom event, for example by stopping changing the amount of zoom in/out applied to the GUI or zoomable region.

FIG. 19 illustrates a calibration method 1900 for aligning a display coordinate with a radar coordinate, according to this disclosure. The embodiment of the calibration method 1900 shown in FIG. 19 is for illustration only, and other embodiments could be used without departing from the scope of this disclosure.

For the virtual touch interaction, a good user experience occurs when the coordinate of the screen is aligned with the coordinate of the radar so that the target position detected by the radar is correctly shown at the corresponding position of the hand on the screen. For the hardware configuration 201 where the radar 206 is built into the body of the display device 210 (e.g., like radar is installed somewhere at the bottom of the screen), the calibration or alignment of the coordinates (in accordance with the method 1900) could be performed in the factory without user intervention. In other cases, such as hardware configurations 202-203 of an add-on accessory or when using a mobile device with a radar (like a smartphone) to provide virtual touch interaction for an existing display device 220, 250 (which could be projected onto a passive screen 248 (or passive device) like a wall when used with a projector 240), the calibration method 1900 is performed with the help of the user.

After the hardware configuration is built by the factory or is setup by the user (e.g., placing the radar at the appropriate location and ensuring that it is connected to the main controller), the processor 120 is ready to start the calibration method 1900. At block 1910, proper setup of the radar (e.g., 710 of FIG. 8) with respect to the display screen 700 is performed by the factory or user. At block 1920, the processor 120 can instruct the user to tap at several different (e.g., random) points on the screen 700. At block 1930, the processor can map or determine a mapping between the radar coordinate and the screen coordinate from radar measurements corresponding to those several different points where the user tapped on the screen 700.

To do this calibration, the processor 120 outputs guidance instructions to the user, asking the user to do tapping at various points ("calibration points") on the screen sequentially. Since this is a 2D translation problem, only a minimum of two reference calibration points are needed. While the radar can detect in 3D, here for this alignment, first the detected target parameters are used to find the projected point on the screen. In reality, to reduce impact of noisy estimates, more than two reference calibration points could be used from the user taps, and a least-square problem could be solved to obtain the translation parameter.

Considering that regions too far off from the reference axis 714 at the boresight angle (i.e., could be out of the radar FoV) might not provide a reliable detection, some embodiments impose a distribution on the different calibration point selections (where the user taps) for the calibrations. For example, points towards the edge of the FoV could be selected with a lower probability. Any other ways to do the selection of the calibration points for the calibration may be used. For example, the calibrations points may be preselected, for example by designers of the virtual touch app 149.

Figure 20:
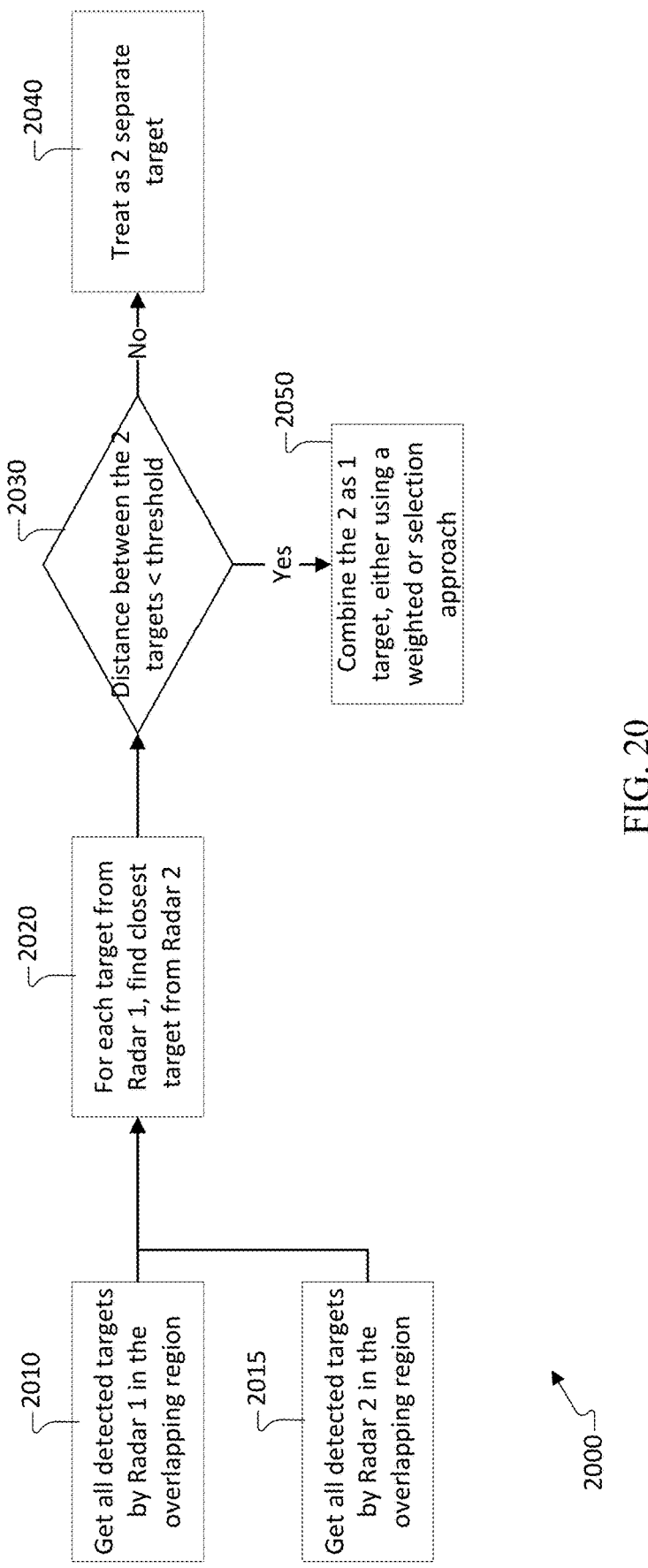
FIG. 20 illustrates a method to combine targets detected within an overlap region of two adjacent radars, according to this disclosure.

FIG. 20 illustrates a method 2000 to combine targets detected within an overlap region (284 of FIG. 2E) of two adjacent radars 280 and 282, according to this disclosure. The embodiment of the method 2000 shown in FIG. 20 is for illustration only, and other embodiments could be used without departing from the scope of this disclosure. The method 2000 will be described as being implemented with the hardware configuration 205 of FIG. 2E.

The method 2000 uses multiple radars 280 and 282 to improve ROI coverage of the screen 290. Depending on the screen size and the placement of the radars 280 and 282, the overlap between the united FoV 200*e*-200*f* of the radars and the screen 290 might not be enough to provide a satisfactory virtual touch interaction experience. For example, a boundary of the first FoV 200*e* could cross a bottom and a side of the display area 290 such that the right half of the display area 290 is not covered by the first FoV 200*e*. This issue can be resolved by using multiple radars together so that the union of corresponding radar fields of view 200*e*-200*f* would cover most or all of the screen 290. As an example shown in FIG. 2E, the FoV 200*e* or 200*f* of one radar 280 or 282 only covers approximately half of the screen 290, yet with two radars, most of the screen 290 can be covered by the union of corresponding fields of view 200*e*-200*f*. While the illustration in FIG. 2E only shows two radars, depending on the screen size and the FoV of multiple radars, more than two radars could be utilized.

The method 2000 includes procedures to combine the detection results from the multiple radars for operating virtual touch interaction. For simplicity in explanation, the method 2000 is described with a scenario of using two radars, but the method 2000 is applicable to more than two radars.

Potentially, interference between the radars could occur when the transmission of the first radar 280 could be received by the second radar 282 or vice versa. This interference could occur if the radar pulses are emitted very close to each other in time. The radars 280-282 can be synchronized so that their pulses are spaced far enough apart, such an interference can be avoided. Even without this level of synchronization, due to the sparsity of the radar, the potential for interference can already be rare. This is because for a typical radar configuration, the duty cycle of the radar could be less than 1%. Another protection that can be added is to apply orthogonal coding for transmitting the radar pulses from the two radars 280-282. For the operation of the virtual touch interaction using multiple radars, the radar detection updates from the multiple radars 280-282 are synchronized, but the synchronization level required is relatively loose, such as on the order of milliseconds.

If the radars are synchronized up to the radar detection updates and the interference between the radars is negligible, then a remaining problem for using multiple radars is how to handle the overlap region 284 in the united FoV 200*e*-200*f* of the two adjacent radars 280-282. Various approaches could be used for combining detection results in the overlapped region 284, such as a weighted combining of the target detected by the two radars 280-282 in their overlapped region, or as another example, selecting one detection result from among the two detection results in the overlap region from the two radars.

The factors to consider as a basis to choose one of the two approaches could be the reliability of the radar angle estimation particularly at the edge of the FoV. If the radar's FOV is relatively narrow (e.g., between 60 to 90 degrees), this angle estimation at the edge of the FoV usually is not a problem. In such a case, the weighted combining approach could be selected to improve the accuracy of the parameters estimated. For example, the combined speed estimate can be the estimated speed (after appropriately compensating the different radar locations) by the two radars weighted by their respective signal strengths. Similar combining could be executed for other estimated parameters.

In other situations, the selection approach could be chosen. In this selection approach, if the edge of the FoV tends to be more problematic, and if radar measurements towards the inside of the FoV are more reliable, then one criterion is the distance to the center of the FoV. This distance to the center of the FoV could be defined as the difference between the detected tangential angle of the target and the tangential angle corresponding to the boresight of the radar (i.e., the center angle of the FoV) at the reference axis 714. These procedures, including weighted combining approach and/or selection approach, could be implemented according to the method 2000. This disclosure makes no assumption on the number of targets within the overlap region, and the number of targets would be less than two for a large majority of use cases.

The method 2000 includes procedures to determine if a target is in the overlap region 284. The method 1900 of FIG. 19 on how to align the coordinate of the radar and the screen can be repurposed for this configuration as well. On additional check is to ensure that a sufficient number of calibration points (at least two for each radar) are measured by the two radars for aligning each radar 280 and 282, respectively. Once this calibration step is complete, the determination of (boundaries of or all coordinates within) the overlap region 284 can be computed simply from the coordinate region of the FoV of the two radars, by computing the intersection of the two FoVs in this global coordinate of the screen. To check if a target is in the overlapping region, the processor 120 determines if the target is within the coordinate areas corresponding to the overlapping region 284 or not.

At block 2010, the processor 120 obtains a set of (e.g., all) objects detected by the first radar 280 in the overlap region 284. Similarly, at block 2015, the processor 120 obtains a set of (e.g., all) objects detected by the second radar 282 in the overlap region 284. At block 2020, for each object detected by the first radar 280 in the overlap region, the processor 120 determines the closest object detected by the second radar 282 in the overlap region. At block 2030, the processor 120 determines whether a threshold distance condition (i.e., calculated distance<threshold distance) is satisfied by a calculated distance between the two objects determined as closest to each other. At block 2040, if the threshold distance condition is not satisfied then the processor 120 determines and treats the two objects determined as closest to each other as two separate objects detected (e.g., two targets if within the ROI). At block 2050, if the threshold distance condition is satisfied then the processor 120 combines the two objects determined as closest to each other as one object detected (e.g., one target if within the ROI), by using a weighted combining approach or a selection approach to get the parameters (e.g., range, angle, and speed) of the target.

Figure 21:
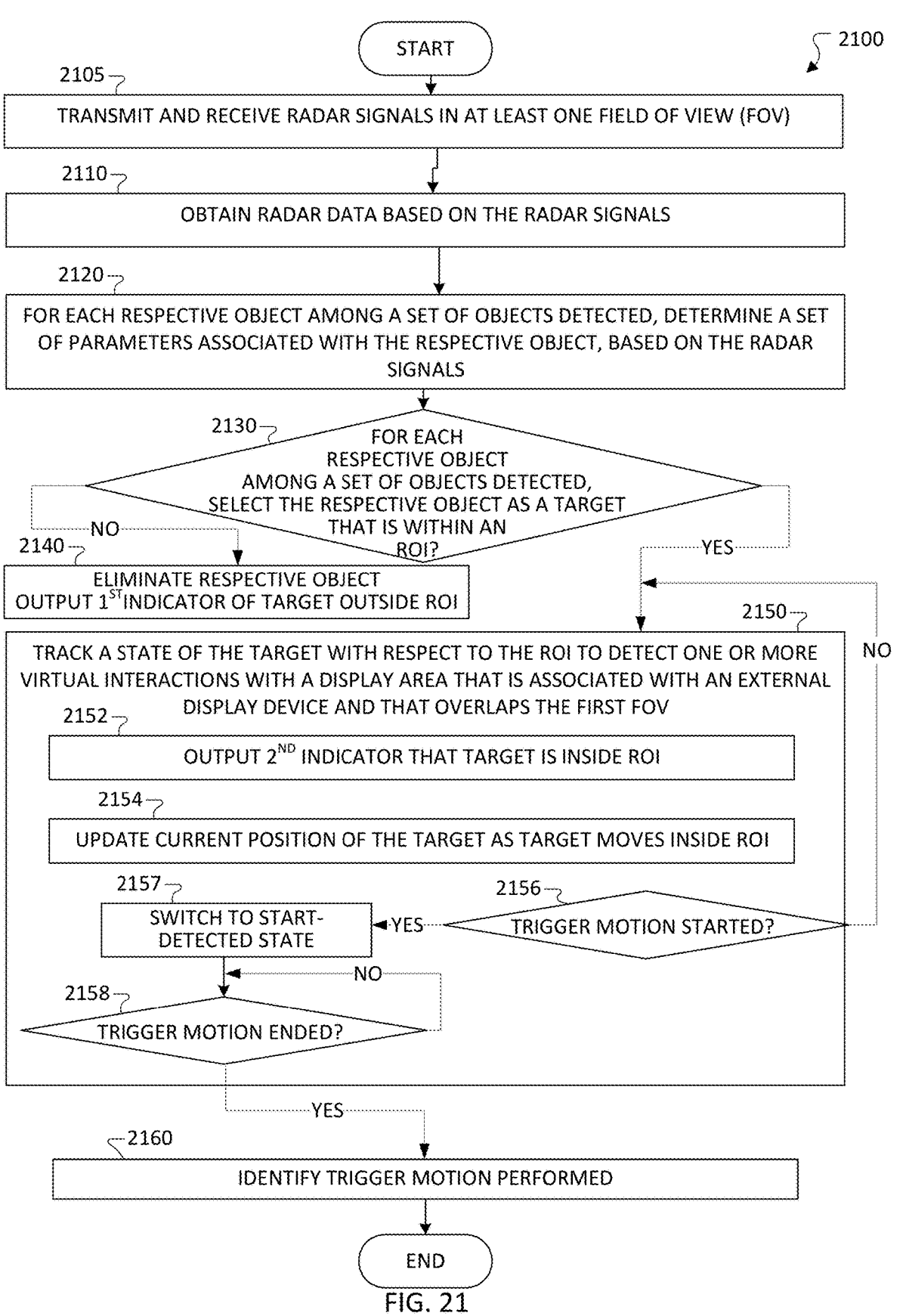
FIG. 21 illustrates a method for virtual touch interaction for any display devices using radar, according to this disclosure.

FIG. 21 illustrates a method 2100 for virtual touch interaction for any display devices using radar, in accordance with an embodiment of this disclosure. The embodiment of the method 2100 shown in FIG. 21 is for illustration only, and other embodiments could be used without departing from the scope of this disclosure.

In block 2105, the at least one transceiver 172 transmits and receives radar signals in at least one field of view (FoV). More particularly, a first radar 174 transmits and receives radar signals in a first FoV. In some embodiments, multiple radars (for example, first and second radars 280 and 282) transmit and receive radar signals in multiple FoVs (for example, first FoV 200e and second FoV 200f).

In block 2110, the processor 120 obtains radar data based on the radar signals. The processor 120 is operably coupled to the at least one transceiver 172.

At block 2120, for each respective object among a set of objects detected, the processor 120 determines a set of parameters associated with the respective object, based on the radar signals. The set of parameters includes a normal angle of the respective object. In some embodiments, set of parameters additionally includes a tangential angle and a range of the respective object.

At block 2130, for each respective object among a set of objects detected, the processor 120 selects the respective object as a target that is within a region-of-interest (ROI), in response to a determination that the set of parameters satisfy a definition of the ROI. In other words, the processor 120 determines whether the respective object is within the ROI, and classifies the respective object as a target if the determination result is that the respective object is within the ROI. The definition of the ROI is satisfied based on a determination that the normal angle of the respective object is within a normal-angle threshold interval. In some embodiments, the definition of the ROI is satisfied based on a determination that a range of the respective object and a tangential angle of the respective object correspond to coordinates in a tangential plane that are within boundaries of the display area.

At block 2140, in response to a determination that the set of parameters associated with the respective object do not satisfy the definition of the ROI, the processor 120 eliminates (for example, discards) the respective object. For each respective object among a set of objects detected, the processor 120 outputs a first indicator that the respective object is not within the ROI, in response to a determination that the normal angle of the respective object is not within a normal-angle threshold interval.

At block 2150, the processor 120 tracks a state of the target with respect to the ROI to detect one or more virtual interactions with a display area that is associated with an external display device and that overlaps the first FoV. In some embodiments, tracking the state of the target includes outputting a position of the target in a tangential plane of the ROI, based on the virtual touch event detected. To output the position of the target in the tangential plane of the ROI, the processor 120 can display a cursor at a position on a GUI that is mapped to (corresponds to) radar coordinates of the target.

At block 2152, the processor 120 outputs a second indicator that the target is within the ROI, in response to the respective object selected as the target. In some embodiments, the second indicator can include the position of the target in the tangential plane of the ROI. In some embodiments when the target is within the ROI, the second indicator is a cursor that is displayed (i.e., output via a display) on a GUI.

At block 2154, for each respective object among a set of objects detected, the processor 120 updates the current position of the target as the target moves inside the ROI. The procedure at block 2154 is similar to the procedure of blocks 1410, 1515, 1630, 1730, 1830, of FIGS. 14-18.

At blocks 2156-2158, for each respective object among a set of objects detected, the processor 120 detects (including monitoring the ROI to detect) an occurrence of a virtual touch event among the one or more virtual interactions, based on a determination that the target is within the ROI. In some embodiments, the one or more virtual interactions include a virtual click, virtual swipe, virtual scroll, virtual drag and drop, and virtual zoom. More particularly, the processor 120 detects an occurrence of a virtual click event among the one or more virtual interactions, based on a determination that motion of the target corresponds to a trigger motion. In some embodiments, a virtual click event occurs when the target enters the ROI, and entrance into the ROI can be a trigger motion assigned to the virtual click event.

In some embodiments, the trigger motion assigned to the virtual click event includes more than entrance of the target into the ROI, or mere presence of the target within the ROI. For example, an up-tapping gesture can be the trigger motion for the virtual click event. A down-tapping gesture can be the trigger motion for the virtual click event, as another example. At blocks 2156-2158, for each respective object among a set of objects detected, the processor 120 determines whether the motion of the target corresponds to a trigger motion assigned to any among the one or more virtual interactions.

At block 2156, as part of determining whether the motion of the target corresponds to a trigger motion assigned to any among the one or more virtual interactions, the processor 120 determines a Doppler estimate of the target as part the set of parameters associated with the target selected, while the state is a start-not-detected state associated with detection of the trigger motion. Further, the processor 120 detects a start of the trigger motion, in response to a determination that the Doppler estimate of the target while in the start-not-detected state exceeds a first Doppler threshold.

At block 2157, in response to a determination that the Doppler estimate of the target while in the start-not-detected state exceeds a first Doppler threshold, the processor 120 switches the state of the target to a start-detected state.

At block 2158, the processor 120 determines whether the trigger motion (currently in progress) ended. The end of the trigger motion indicates that the trigger motion has been performed. To determine whether the trigger motion ended, the processor 120 compares the Doppler estimate (i.e., updated Doppler estimate) a second Doppler threshold that is associated with detection of an end of the trigger motion and that is less than the first Doppler threshold. A determination that the updated Doppler estimate is less than the second Doppler threshold indicates that the trigger motion ended, in which case the method 2100 proceeds to block 2160. If the trigger motion has not ended, for each determination that the updated Doppler estimate is not less than a second Doppler threshold, then the procedures of blocks 2154 and 2158 are repeated such that the processor 120 repeatedly updates the Doppler estimate of the target and remains in the start-detected state.

At block 2160, the processor 120 identifies the trigger motion performed. For example, as shown in FIG. 2B, within the electronic device 230 that includes the radar, the processor 120 sends an indicator that identifies the trigger motion to the (OS of the) external display device 220, in response to the virtual click event detected.

In some embodiments, while the display area corresponds to a swipe-enabled graphical user interface (GUI), the processor 120 can determine a start point of a swipe virtual interaction as a position of the target in a tangential plane of the ROI when the virtual click event occurred. The processor 120 can repeatedly update the set of parameters associated with the target to determine a current position of the target. The processor 120 can output the current position of the target to the external display device while the updated set of parameters indicate that the target maintains movement in the tangential plane in a direction away from the start point of the swipe. The processor 120 can indicate to the external display device that the swipe is completed, in response to at least one of: a determination that the target stopped the movement; a determination that a current position of the target corresponds to an end of a slider of the GUI; or a determination that the target exited the ROI at a speed that exceeds an exit speed threshold and at an exit position that is at least a threshold percentage of a length of the slider.

In some embodiments, while the display area corresponds to a zoom-enabled graphical user interface (GUI), the processor can further initiate a zoom virtual interaction in response to detecting two targets within the ROI, wherein positions of the two targets in a tangential plane of the ROI are start points of a zoom pinch. For each of the two targets, the processor 120 can repeatedly update the set of parameters associated with the target to determine a current position of the target. The processor 120 can output the current positions of the two targets to the external display device while the two targets maintain movement of the zoom pinch in the tangential plane in a direction away from each other or toward each other. Further, the processor 120 can indicate to the external display device that the zoom virtual interaction is completed, in response to a determination that the two targets stopped the movement or that a distance between the current positions of the two targets is less than a threshold distance.

Although FIG. 21 illustrates an example method 2100, various changes may be made to FIG. 21. For example, while shown as a series of steps, various steps in FIG. 21 could overlap, occur in parallel, occur in a different order, or occur any number of times. As a particular example, as part of executing the method 2100, the processor 120 can generate the definition of the ROI such that points of the display area correspond to positions of the target with respect to the transceiver, respectively.

To generate the definition of the ROI, the processor 120 connects to and controls an external display device to output a graphical user interface (GUI) within the display area, wherein the GUI includes a prompt for a user to perform a trigger motion proximate to a point of the display area where the prompt is displayed. The GUI displays the prompt at a series of different points at different times. For each among the series of different points of the display area, the processor 120 determines a position of the target where the user performed the trigger motion. The processor 120 calibrates the electronic device such that the position of the target where the user performed the trigger motion corresponds to the point of the display area where the prompt is displayed.

As another example, the processor 120 generates the definition of the ROI such that points of the display area correspond to positions of the target with respect to multiple transceivers including the transceiver of the electronic device and a second transceiver of a second electronic device configured to transmit and receive radar signals in a second FoV that overlaps a portion of the display area. The processor 120 generates a definition of an overlap region within the ROI where the first FoV overlaps the second FoV. The processor 120 calibrates the electronic device such that the point of the display area where the prompt is displayed, when displayed within the overlap region, corresponds to first and second positions of the target where the user performed the trigger motion in the first and second FoVs, respectively. The processor 120 determines whether the first position of the target and the second position of the target represent a same target or different targets in the overlap region based on a threshold distance compared to a distance between the first and second positions of the target.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining, by a processor operably connected to a transceiver that is configured to transmit and receive radar signals in a first field of view (FoV), radar data based on the radar signals;
   for each respective object among a set of objects detected:
      determining a set of parameters associated with the respective object, based on the radar signals, wherein the set of parameters includes a normal angle of the respective object; and
      selecting the respective object as a target that is within a region-of-interest (ROI), in response to a determination that the set of parameters satisfy a definition of the ROI, wherein the definition of the ROI is satisfied based on a determination that the normal angle of the respective object is within a normal-angle threshold interval that includes a normal angle of the transceiver; and tracking a state of the target with respect to the ROI to detect one or more virtual interactions with a display area that is associated with an external display device and that overlaps the first FoV.

2. The method of claim 1, wherein:

the set of parameters includes a tangential angle of the respective object and a range of the respective object; and the method further includes, for each respective object among a set of objects detected:

outputting a first indicator that the respective object is not within the ROI, in response to a determination that the normal angle of the respective object is not within a normal-angle threshold interval;

selecting the respective object as the target, wherein the definition of the ROI is satisfied based on a determination that a range of the respective object and a tangential angle of the respective object correspond to coordinates in a tangential plane that are within boundaries of the display area; and outputting a second indicator that the target is within the ROI, in response to the respective object selected as the target.

3. The method of claim 1, further comprising:

detecting an occurrence of a virtual touch event among the one or more virtual interactions, based on a determination that the target is within the ROI; and outputting a position of the target in a tangential plane of the ROI, based on the virtual touch event detected.

4. The method of claim 1, further comprising:

detecting an occurrence of a virtual click event among the one or more virtual interactions, based on a determination that motion of the target corresponds to a trigger motion; and in response to the virtual click event detected, sending an indicator that identifies the trigger motion to the external display device, wherein determining whether the motion of the target corresponds to the trigger motion that is an up-tapping gesture or a down-tapping gesture, further comprises:

determining a Doppler estimate of the target as part of the set of parameters associated with the target selected, while the state is a start-not-detected state associated with detection of the trigger motion;

detecting a start of the trigger motion and switch the state to a start-detected state, in response to a determination that the Doppler estimate of the target while in the start-not-detected state exceeds a first Doppler threshold;

repeatedly updating the Doppler estimate of the target and remain in the start-detected state for each determination that the updated Doppler estimate is not less than a second Doppler threshold that is associated with detection of an end of the trigger motion and that is less than the first Doppler threshold; and detecting an end of the trigger motion as the determination that the motion of the target corresponds to the trigger motion and switch to the start-not-detected state, in response to a determination that the updated Doppler estimate is less than the second Doppler threshold.

5. The method of claim 4, further comprising:

while the display area corresponds to a swipe-enabled graphical user interface (GUI), determining a start point of a swipe virtual interaction as a position of the target in a tangential plane of the ROI when the virtual click event occurred;

repeatedly updating the set of parameters associated with the target to determine a current position of the target;

outputting the current position of the target to the external display device while the updated set of parameters indicate that the target maintains movement in the tangential plane in a direction away from the start point of the swipe; and indicating to the external display device that the swipe is completed, in response to at least one of:

a determination that the target stopped the movement;

a determination that a current position of the target corresponds to an end of a slider of the GUI; or a determination that the target exited the ROI at a speed that exceeds an exit speed threshold and at an exit position that is at least a threshold percentage of a length of the slider.

6. The method of claim 1, further comprising:

while the display area corresponds to a zoom-enabled graphical user interface (GUI), initiating a zoom virtual interaction in response to detecting two targets within the ROI, wherein positions of the two targets in a tangential plane of the ROI are start points of a zoom pinch;

for each of the two targets, repeatedly updating the set of parameters associated with the target to determine a current position of the target;

outputting the current positions of the two targets to the external display device while the two targets maintain movement of the zoom pinch in the tangential plane in a direction away from each other or toward each other; and indicating to the external display device that the zoom virtual interaction is completed, in response to a determination that the two targets stopped the movement or that a distance between the current positions of the two targets is less than a threshold distance.

7. The method of claim 1, further comprising:

generating the definition of the ROI such that points of the display area correspond to positions of the target with respect to the transceiver, respectively, wherein generating the definition of the ROI includes connecting to and controlling an external display device to output a graphical user interface (GUI) within the display area, wherein the GUI includes a prompt for a user to perform a trigger motion proximate to a point of the display area where the prompt is displayed, and wherein the GUI displays the prompt at a series of different points at different times;

for each among the series of different points of the display area:

determining a position of the target where the user performed the trigger motion; and calibrating an electronic device such that the position of the target where the user performed the trigger motion corresponds to the point of the display area where the prompt is displayed, wherein the electronic device includes the processor and the transceiver.

8. The method of claim 7, further comprising:

generating the definition of the ROI such that points of the display area correspond to positions of the target with respect to multiple transceivers including the transceiver of the electronic device and a second transceiver of a second electronic device configured to transmit and receive radar signals in a second FoV that overlaps a portion of the display area, generating a definition of an overlap region within the ROI where the first FoV overlaps the second FoV;

calibrating the electronic device such that the point of the display area where the prompt is displayed, when displayed within the overlap region, corresponds to first and second positions of the target where the user performed the trigger motion in the first and second FoVs, respectively; and determining whether the first position of the target and the second position of the target represent a same target or different targets in the overlap region based on a threshold distance compared to a distance between the first and second positions of the target.

9. An electronic device comprising:
a transceiver configured to transmit and receive radar signals in a first field of view (FoV); and
a processor operably connected to the transceiver and configured to:
  obtain radar data based on the radar signals;
  for each respective object among a set of objects detected:
    determine a set of parameters associated with the respective object, based on the radar signals, wherein the set of parameters includes a normal angle of the respective object; and
    select the respective object as a target that is within a region-of-interest (ROI), in response to a determination that the set of parameters satisfy a definition of the ROI, wherein the definition of the ROI is satisfied based on a determination that the normal angle of the respective object is within a normal-angle threshold interval that includes a normal angle of the transceiver; and
  track a state of the target with respect to the ROI to detect one or more virtual interactions with a display area that is associated with an external display device and that overlaps the first FoV.

10. The electronic device of claim 9, wherein:
the set of parameters includes a tangential angle of the respective object and a range of the respective object; and
for each respective object among a set of objects detected, the processor is further configured to:
  output a first indicator that the respective object is not within the ROI, in response to a determination that the normal angle of the respective object is not within a normal-angle threshold interval;
  select the respective object as the target, wherein the definition of the ROI is satisfied based on a determination that a range of the respective object and a tangential angle of the respective object correspond to coordinates in a tangential plane that are within boundaries of the display area; and
  output a second indicator that the target is within the ROI, in response to the respective object selected as the target.

11. The electronic device of claim 9, wherein the processor is further configured to:
detect an occurrence of a virtual touch event among the one or more virtual interactions, based on a determination that the target is within the ROI; and
output a position of the target in a tangential plane of the ROI, based on the virtual touch event detected.

12. The electronic device of claim 9, wherein the processor is further configured to:
detect an occurrence of a virtual click event among the one or more virtual interactions, based on a determination that motion of the target corresponds to a trigger motion; and
in response to the virtual click event detected, send an indicator that identifies the trigger motion to the external display device,
wherein to determine whether the motion of the target corresponds to the trigger motion that is an up-tapping gesture or a down-tapping gesture, the processor is further configured to:
  determine a Doppler estimate of the target as part the set of parameters associated with the target selected, while the state is a start-not-detected state associated with detection of the trigger motion;
  detect a start of the trigger motion and switch the state to a start-detected state, in response to a determination that the Doppler estimate of the target while in the start-not-detected state exceeds a first Doppler threshold;
  repeatedly update the Doppler estimate of the target and remain in the start-detected state for each determination that the updated Doppler estimate is not less than a second Doppler threshold that is associated with detection of an end of the trigger motion and that is less than the first Doppler threshold; and
  detect an end of the trigger motion as the determination that the motion of the target corresponds to the trigger motion and switch to the start-not-detected state, in response to a determination that the updated Doppler estimate is less than the second Doppler threshold.

13. The electronic device of claim 12, wherein the processor is further configured to:
while the display area corresponds to a swipe-enabled graphical user interface (GUI), determine a start point of a swipe virtual interaction as a position of the target in a tangential plane of the ROI when the virtual click event occurred;
repeatedly update the set of parameters associated with the target to determine a current position of the target;
output the current position of the target to the external display device while the updated set of parameters indicate that the target maintains movement in the tangential plane in a direction away from the start point of the swipe; and
indicate to the external display device that the swipe is completed, in response to at least one of:
  a determination that the target stopped the movement;
  a determination that a current position of the target corresponds to an end of a slider of the GUI; or
  a determination that the target exited the ROI at a speed that exceeds an exit speed threshold and at an exit position that is at least a threshold percentage of a length of the slider.

14. The electronic device of claim 9, wherein the processor is further configured to:
while the display area corresponds to a zoom-enabled graphical user interface (GUI), initiate a zoom virtual interaction in response to detecting two targets within the ROI, wherein positions of the two targets in a tangential plane of the ROI are start points of a zoom pinch;

for each of the two targets, repeatedly update the set of
parameters associated with the target to determine a
current position of the target;
output the current positions of the two targets to the
external display device while the two targets maintain
movement of the zoom pinch in the tangential plane in
a direction away from each other or toward each other;
and
indicate to the external display device that the zoom
virtual interaction is completed, in response to a deter-
mination that the two targets stopped the movement or
that a distance between the current positions of the two
targets is less than a threshold distance.

15. The electronic device of claim 9, wherein the proces-
sor is further configured to generate the definition of the ROI
such that points of the display area correspond to positions
of the target with respect to the transceiver, respectively,
wherein to generate the definition of the ROI, the proces-
sor is further configured to:
connect to and control an external display device to
output a graphical user interface (GUI) within the
display area, wherein the GUI includes a prompt for
a user to perform a trigger motion proximate to a
point of the display area where the prompt is dis-
played, and wherein the GUI displays the prompt at
a series of different points at different times;
for each among the series of different points of the
display area:
determine a position of the target where the user
performed the trigger motion; and
calibrate the electronic device such that the position
of the target where the user performed the trigger
motion corresponds to the point of the display area
where the prompt is displayed.

16. The electronic device of claim 15, wherein the pro-
cessor is further configured to:
generate the definition of the ROI such that points of the
display area correspond to positions of the target with
respect to multiple transceivers including the trans-
ceiver of the electronic device and a second transceiver
of a second electronic device configured to transmit and
receive radar signals in a second FoV that overlaps a
portion of the display area,
generate a definition of an overlap region within the ROI
where the first FoV overlaps the second FoV;
calibrate the electronic device such that the point of the
display area where the prompt is displayed, when
displayed within the overlap region, corresponds to first
and second positions of the target where the user
performed the trigger motion in the first and second
FoVs, respectively; and
determine whether the first position of the target and the
second position of the target represent a same target or
different targets in the overlap region based on a
threshold distance compared to a distance between the
first and second positions of the target.

17. An electronic display device comprising:
a display configured to output a graphical user interface
(GUI) on a display area;
a transceiver configured to transmit and receive radar
signals in a field of view (FoV) that overlaps the display
area; and
a processor operably connected to the display and the
transceiver and configured to:
obtain radar data based on the radar signals;
for each respective object among a set of objects
detected:

determine a set of parameters associated with the
respective object, based on the radar signals,
wherein the set of parameters includes a normal
angle of the respective object; and
select the respective object as a target that is within
a region-of-interest (ROI), in response to a deter-
mination that the set of parameters satisfy a defi-
nition of the ROI, wherein the definition of the
ROI is satisfied based on a determination that the
normal angle of the respective object is within a
normal-angle threshold interval that includes a
normal angle of the transceiver; and
track a state of the target with respect to the ROI to
detect one or more virtual interactions with the
display area.

18. The electronic display device of claim 17, wherein:
the set of parameters includes a tangential angle of the
respective object and a range of the respective object;
and
for each respective object among a set of objects detected,
the processor is further configured to:
output a first indicator that the respective object is not
within the ROI, in response to a determination that
the normal angle of the respective object is not
within a normal-angle threshold interval;
select the respective object as the target, wherein the
definition of the ROI is satisfied based on a deter-
mination that a range of the respective object and a
tangential angle of the respective object correspond
to coordinates in a tangential plane that are within
boundaries of the display area; and
output a second indicator that the target is within the
ROI, in response to the respective object selected as
the target.

19. The electronic display device of claim 17, wherein the
processor is further configured to:
detect an occurrence of a virtual touch event among the
one or more virtual interactions, based on a determi-
nation that the target is within the ROI; and
output a position of the target in a tangential plane of the
ROI, based on the virtual touch event detected.

20. The electronic display device of claim 17, wherein the
processor is further configured to:
detect an occurrence of a virtual click event among the
one or more virtual interactions, based on a determi-
nation that motion of the target corresponds to a trigger
motion; and
in response to the virtual click event detected, generate an
indicator that identifies the trigger motion,
wherein to determine whether the motion of the target
corresponds to the trigger motion that is an up-tapping
gesture or a down-tapping gesture, the processor is
further configured to:
determine a Doppler estimate of the target as part the
set of parameters associated with the target selected,
while the state is a start-not-detected state associated
with detection of the trigger motion;
detect a start of the trigger motion and switch the state
to a start-detected state, in response to a determina-
tion that the Doppler estimate of the target while in
the start-not-detected state exceeds a first Doppler
threshold;
repeatedly update the Doppler estimate of the target
and remain in the start-detected state for each deter-
mination that the updated Doppler estimate is not
less than a second Doppler threshold that is associated with detection of an end of the trigger motion and that is less than the first Doppler threshold; and detect an end of the trigger motion as the determination that the motion of the target corresponds to the trigger motion and switch to the start-not-detected state, in response to a determination that the updated Doppler estimate is less than the second Doppler threshold.

\* \* \* \* \*